United States Patent [19]
Yoshida

[11] Patent Number: 6,021,283
[45] Date of Patent: Feb. 1, 2000

[54] PHOTOGRAPHIC FILM CARTRIDGE WITH BAR CODE DISC AND BAR CODE READER FOR USE THEREWITH

[75] Inventor: Yutaka Yoshida, Saitama, Japan

[73] Assignee: Fuji Photo Film Co., Ltd., Kanagawa, Japan

[21] Appl. No.: 08/100,322

[22] Filed: Aug. 2, 1993

[30] Foreign Application Priority Data

Jul. 31, 1992 [JP] Japan .................................... 4-205687
Jul. 31, 1992 [JP] Japan .................................... 4-205688

[51] Int. Cl.⁷ .................................................. G03B 17/24
[52] U.S. Cl. ........................................... 396/408; 396/512
[58] Field of Search .................................... 235/464, 466, 235/463

[56] References Cited

U.S. PATENT DOCUMENTS

| | | | |
|---|---|---|---|
| 4,443,694 | 4/1984 | Sanford | 235/462 |
| 4,449,042 | 5/1984 | Hampson et al. | 235/464 |
| 4,450,349 | 5/1984 | Apitz et al. | 235/463 |
| 4,493,989 | 1/1985 | Hampson et al. | 235/464 |
| 4,816,668 | 3/1989 | Williams et al. | 235/464 |
| 4,864,332 | 9/1989 | Harvey . | |
| 4,992,650 | 2/1991 | Somerville | 235/463 |
| 5,030,978 | 7/1991 | Stoneham et al. | 354/21 |
| 5,032,854 | 7/1991 | Smart et al. | 354/21 |
| 5,049,912 | 9/1991 | Pagano et al. . | |
| 5,103,081 | 4/1992 | Fisher et al. | 235/464 |
| 5,196,685 | 3/1993 | Izumi | 235/463 |

*Primary Examiner*—David M. Gray
*Attorney, Agent, or Firm*—Young & Thompson

[57] ABSTRACT

A photographic film cartridge has a cartridge shell and a spool housed rotatably in the cartridge shell, the spool having a photographic film wound about the spool. A bar code disc is mounted on the cartridge spool, and appears through a window formed in the cartridge shell. The bar code disc is recorded with a bar code representing information describing the photographic film and being comprised by a combination of a plurality of data bars having different optical densities. A bar code sensor measures the optical density of a bar to discriminate between the types of bars. Alternatively, for a bar code formed by two types of bars having different widths, the bar width is detected according to the time period during which the ar code sensor detects the bar. Using a film encoder, a bar-detecting time period to be changed by the film advance speed is corrected. According to a preferred embodiment, a plurality of bars are disposed at an equal interval between adjacent front edges of bars. From the timings of detecting the bar front edges, the film advance speed is measured without using a film encoder.

45 Claims, 19 Drawing Sheets

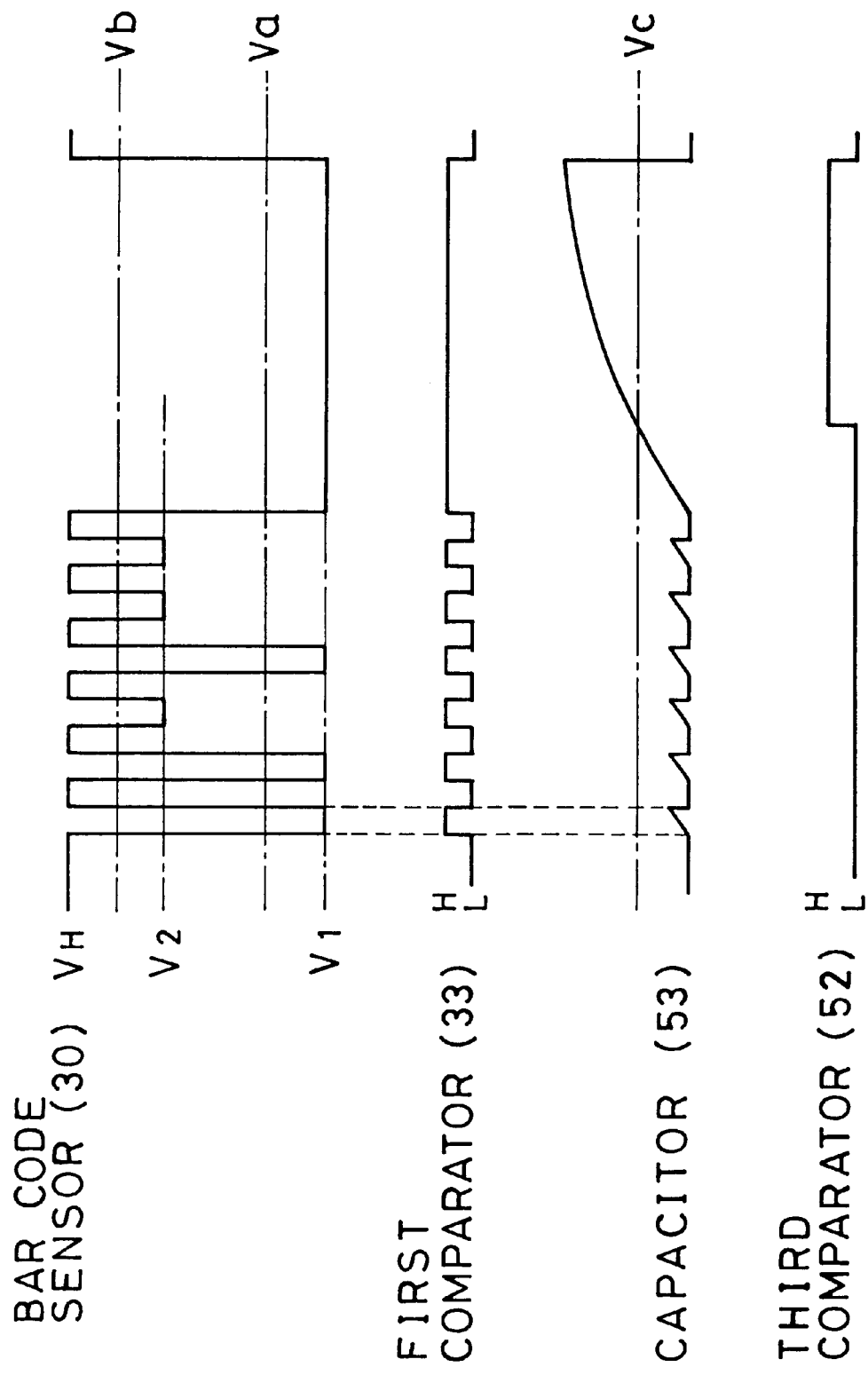

PHOTOGRAPHIC FILM CARTRIDGE WITH BAR CODE DISC AND BAR CODE READER FOR USE THEREWITH

BACKGROUND OF THE INVENTION

1. Field of the Invention

The present invention relates to a photographic film cartridge with a bar code disc, and a bar code reader for use therewith. More particularly, the present invention relates to an apparatus for reading a bar code recorded on a bar code disc while the bar code disc rotates with the cartridge spool in a camera.

2. Description of the Related Art

There is known a photographic film cartridge of the type wherein the leader of the photographic film is advanced out of the cartridge shell by the rotation of the cartridge spool. U.S. Pat. No. 5,049,912 describes an improved version of the photographic film cartridge of this type and a camera that uses it. This photographic film cartridge has a bar code disc mounted on the cartridge spool, the bar code disc being provided with written information specific to the cartridge, such as the sensitivity of the loaded film and the number of frames capable of being photographed. The camera has a bar code reader for reading a bar code recorded on the disc while the cartridge spool rotates. If a bar code is represented by a plurality of bars of different widths, it is necessary to rotate the bar code disc at a constant angular velocity within the camera and to discriminate the bar widths based upon the time period of detecting each bar. If the rotation speed of the cartridge spool is unstable, it becomes necessary to use a highly precise rotary encoder coupled to the bar code disc and to check the film advance amount from a pulse generated by the encoder per unit of rotational angle, each unit comprising a very small angle.

The rotation speed of a motor for driving a take-up spool for winding up a photographic film within the camera changes with the environmental temperature and the power consumption of a camera battery. Even if the rotation speed of the motor is constant, the film advance speed changes with the diameter of the film roll wound about the take-up spool. A change in the film advance speed results in a change in the angular velocity of the cartridge spool rotating with the advance of the photographic film. It is therefore very difficult in practice to rotate the cartridge spool at a constant angular velocity. Use of a precise rotary encoder merely for reading a bar code is disadvantageous as to assembly space and cost.

OBJECTS OF THE INVENTION

It is a principal object of the present invention to provide a photographic film cartridge and a bar code reader capable of reading a bar code, of simple structure.

It is another object of the present invention to provide a bar code reader capable of reliably discriminating the type of bar code even if the angular velocity of the cartridge spool changes.

SUMMARY OF THE INVENTION

In order to achieve the above and other objects, the photographic film cartridge of the invention is provided with a bar code disc mounted on the cartridge spool, the bar code disc being recorded with a bar code represented by at least two types of bars (data bars) having different densities. The bar code disc may be formed by recording a bar code on the core of the cartridge spool, or by attaching a bar code sheet to the flange of the cartridge spool. The bar code disc may be integrally formed with the core at the outside of the flange, or may be fixed to the core. According to the present invention, the type of bar is determined by the optical density (inclusive of average density). It is therefore possible reliably to discriminate between the types of bars without using a high precision rotary encoder which generates a pulse synchronously with rotation through a very small rotary angle unit.

According to the bar code reader of the present invention, each bar of the bar code is detected by a bar code sensor while the bar code disc rotates, thereby to discriminate between the types of bars. With this bar code reader, a bar having a different optical density can be reliably discriminated with a simple circuit structure. According to a preferred embodiment of the present invention, first and second comparators are used for comparing output signals from the bar code sensor. The first comparator checks whether the signal represents a bar, and the second comparator discriminates between the types of bars. A delay circuit delays an output signal of the first comparator by a time sufficiently shorter than the duration of the output signal. In response to the delayed signal, the output of the second comparator is supplied to a shift register. The shift register stores the logical values each assigned to a particular bar, in the order of having read the logical values.

A bar code reader for reading a bar code represented by bars having different widths according to a preferred embodiment of the present invention is provided with a pulse generator and a bar code sensor. The pulse generator generates a pulse each time the film is advanced by a predetermined amount. The types of bars are discriminated in accordance with the output signals from the bar code sensor and the film advance speed or bar code disc angular velocity obtained by the pulse generator. In this embodiment, the angular velocity of the bar code disc is detected, dispensing with a rotary encoder and simplifying the structure of the apparatus. If the period of pulses of the pulse generator is short, the types of bars may be discriminated from the count of pulses supplied from the pulse generator and counted while the bar code sensor detects a bar.

According to another embodiment of the photographic film cartridge of the present invention, a bar code is represented by bars having different widths, with the front edges of adjacent bars being disposed at equal angular intervals. The bar code reader for reading such a bar code is provided with a bar code sensor by which the time period of detecting bar front edges and the period while the bar faces the bar code sensor are measured. From the ratio between the two measured values, the type of bars can be discriminated. In this embodiment, the bar code can be read only by the bar code sensor, and the discrimination between the types of bars is not adversely affected by a change in the rotation speed of the cartridge spool.

BRIEF DESCRIPTION OF THE DRAWINGS

The above and other objects and advantages of the present invention will become apparent from the following detailed description of the preferred embodiments when read in conjunction with the accompanying drawings, in which:

FIG. 13 is a timing chart explaining the operation of the circuit shown in FIG. 11;

DETAILED DESCRIPTION OF THE PREFERRED EMBODIMENTS

Figure 1:
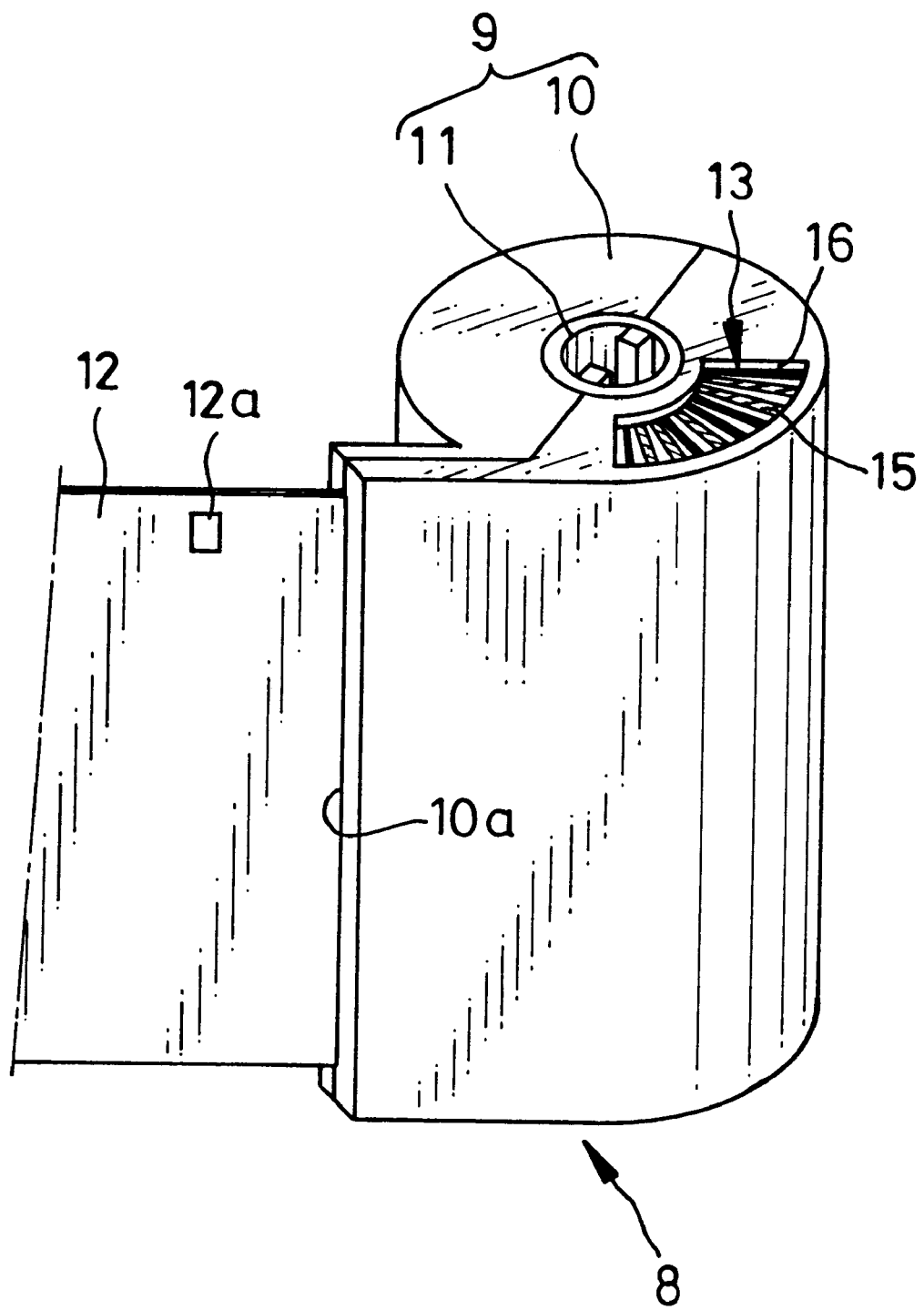
FIG. 1 is a perspective view of an embodiment of a photographic film cartridge according to the present invention.

Referring to FIG. 1, a photographic film cartridge 8 is constituted by a molded plastic cartridge 9 and a photographic film such as an unexposed negative film 12 housed within the cartridge 9. The cartridge 9 is constructed of a cartridge shell 10 and a cartridge spool 11 rotatable in the cartridge shell. The cartridge spool 11 has, as is well known, a core and a pair of flanges mounted at opposite ends of the core (refer to FIG. 3). The negative film 12 is wound about the core between the pair of flanges. The negative film 12 is formed with perforations 12a at an equal pitch, one perforation per frame. A transparent magnetic layer may be formed on one surface of the negative film 12 to record photographic information.

A bar code disc 13 with a bar code 15 is fixed to the cartridge spool 11. The bar code 15 indicates various information such as the speed of the negative film 12, the film latitude, the number of frames available for photographing, the manufacturer's name, and the date of manufacture. In this embodiment, one of the flanges is used as the bar code disc 13 on the upper surface of which the bar code 15 is recorded. A bar code sheet with a printed bar code may be attached to the bar code disc. Alternatively, a bar code disc may be mounted on the core on the outer side of the adjacent flange. A window 16 is formed in the cartridge shell 10 to expose the bar code 15 of the bar code disc 13.

The leader of the negative film 12 is fully contained within the cartridge shell 10 when the photographic film cartridge 8 is not used. The film leader can be advanced out of the cartridge 8 via a film passage mouth 10a as the cartridge spool 11 rotates. A pair of annular ridges 10b is formed on the inner wall of the cartridge shell 10 adjacent opposite ends of the film roll so as to prevent the negative film 12 roll from loosening during rotation of the cartridge spool 11. The pair of flanges may be used to clamp the film roll to prevent the roll from loosening.

Figure 2:
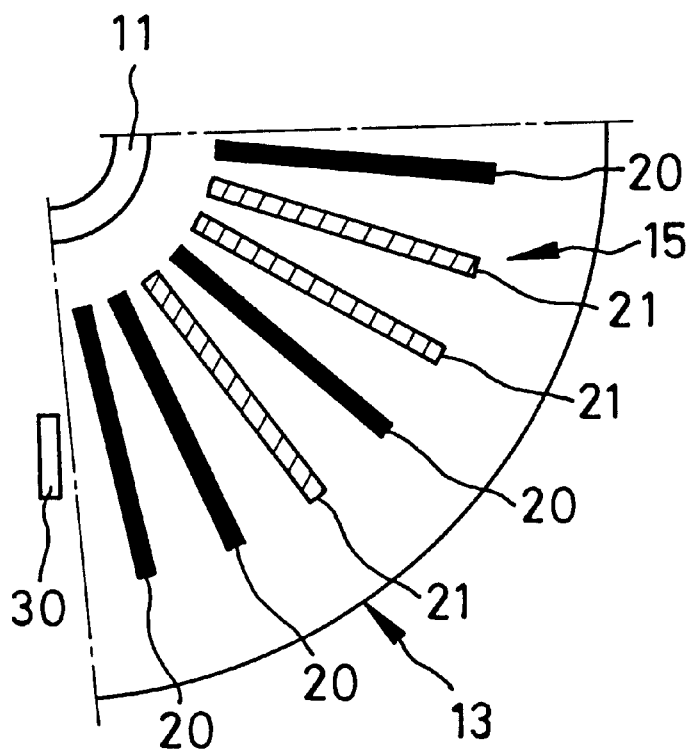
FIG. 2 is a diagram showing an example of a bar code.

As shown in FIG. 2, the bar code 15 displays the film information by a combination of two types of bars (data bars) having different optical densities. Namely, the dark bar (low reflectance bar) 20 represents a logical value "1", and the light bar (high reflectance bar) 21 represents a logical value "0".

Figure 3:
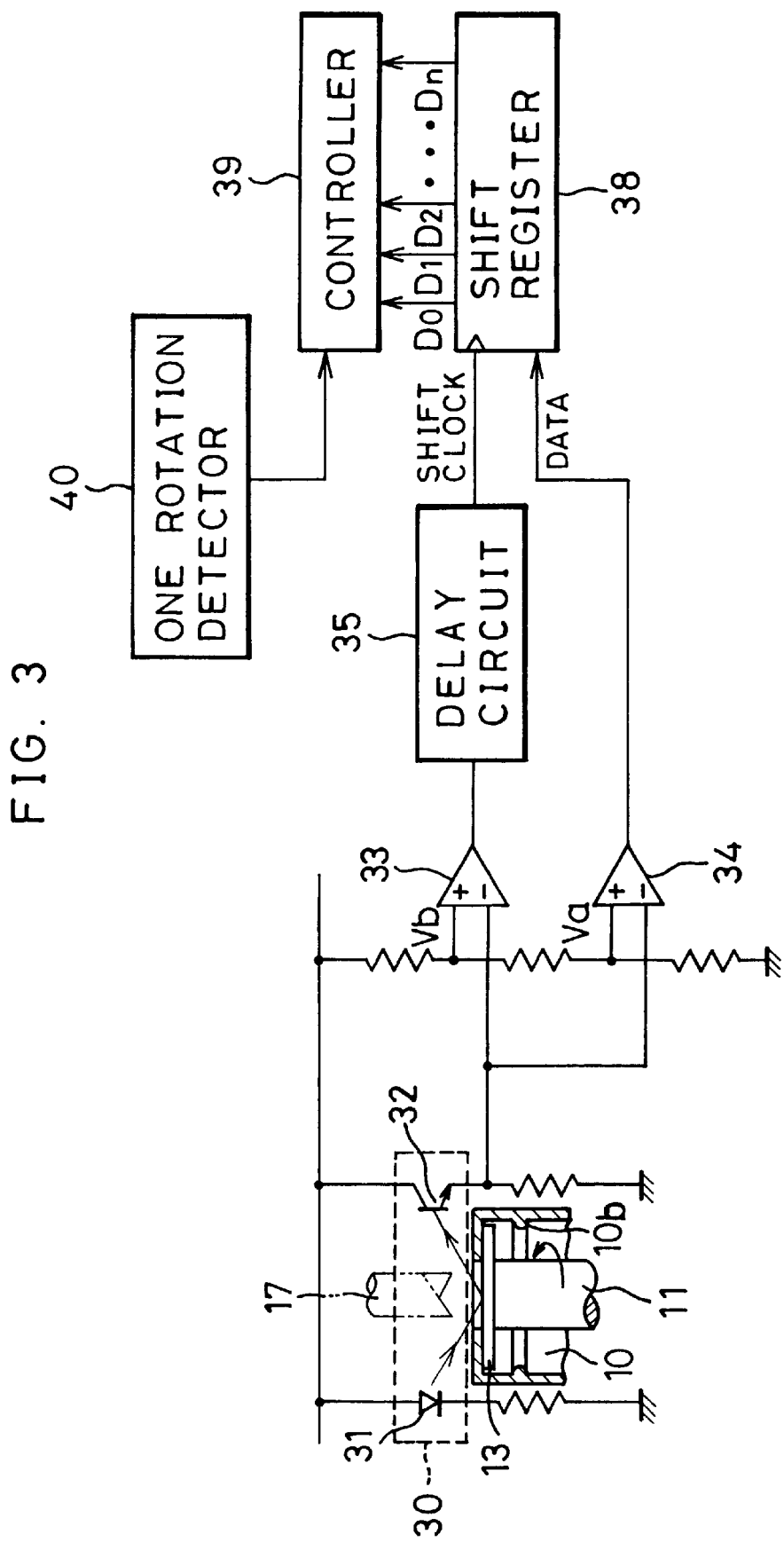
FIG. 3 is a circuit diagram of a bar code reader.

FIG. 3 illustrates a bar code reader built into the camera. A reflection type photosensor (photo interrupter) is used as a bar code sensor 30. The photosensor has a projector 31 and a receiver 32 which are mounted on the inner wall of the cartridge chamber at a position facing the window 16 of the cartridge shell 10. A signal outputted from the bar code sensor 30 is sent to first and second comparators 33 and 34.

Figure 4:
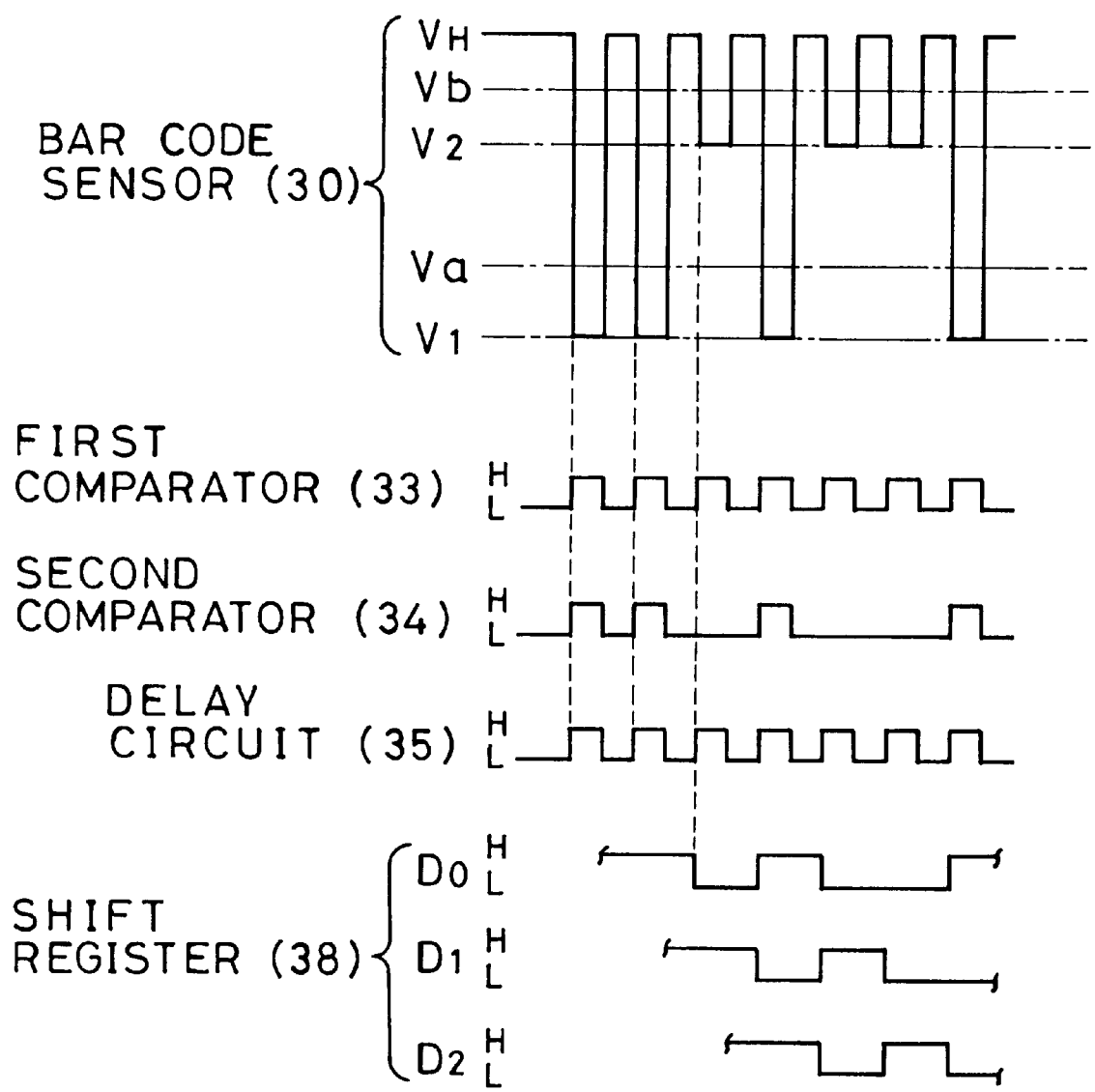
FIG. 4 is a timing chart explaining the operation of the circuit shown in FIG. 3.

As shown in FIG. 4, a reference voltage Vb is applied to the first comparator 33. This reference voltage Vb is lower than the voltage (VH) of a signal outputted when the bar code sensor 30 measures the base (highest reflectance) of the bar code disc 13 and higher than the voltage (V2) of a signal outputted when the sensor 30 measures the light bar 21. When an output signal from the bar code sensor 30 is lower than the reference voltage Vb, the first comparator outputs a signal "L" representing the logical value "0", and when it detects the bar 20 or 21, an "H" signal is outputted. The first comparator 33 therefore judges whether the bar code sensor 30 is detecting the bar 20, 21, and sends the bar detecting "H" signal to a delay circuit 35.

A reference voltage Va is applied to the comparator 34. This reference voltage is higher than the voltage (V1) of a signal outputted when the bar code sensor 30 detects the dark bar 20 and lower than the voltage (V2) of a signal outputted when the light bar 21 is detected. The second comparator 34 therefore generates a signal discriminating between two bars 20 and 21 one of which faces the bar code sensor 30, and sends this signal to a data input terminal of a shift register 38.

The delay circuit 35 delays the output of the first comparator 33 for a time sufficiently shorter than the pulse duration of the output, to shift thereby the shift register 38 at the rising edge of an output of the first comparator 33. As a result, signals detected by the bar code sensor 30 and representing the densities of the bars 20 and 21 are sequentially inputted to the shift register 38. A one-rotation detector 40 generates a signal when the bar code disc 13 rotates once. Synchronously with this signal, outputs of the shift register 38 are ready by a controller 39. Otherwise, one rotation of the bar code disc 13 may be detected by counting the number of bars. The shift register 38 has as many bits, so that it can acquire all the information on the bar code disc 13.

Figure 5:
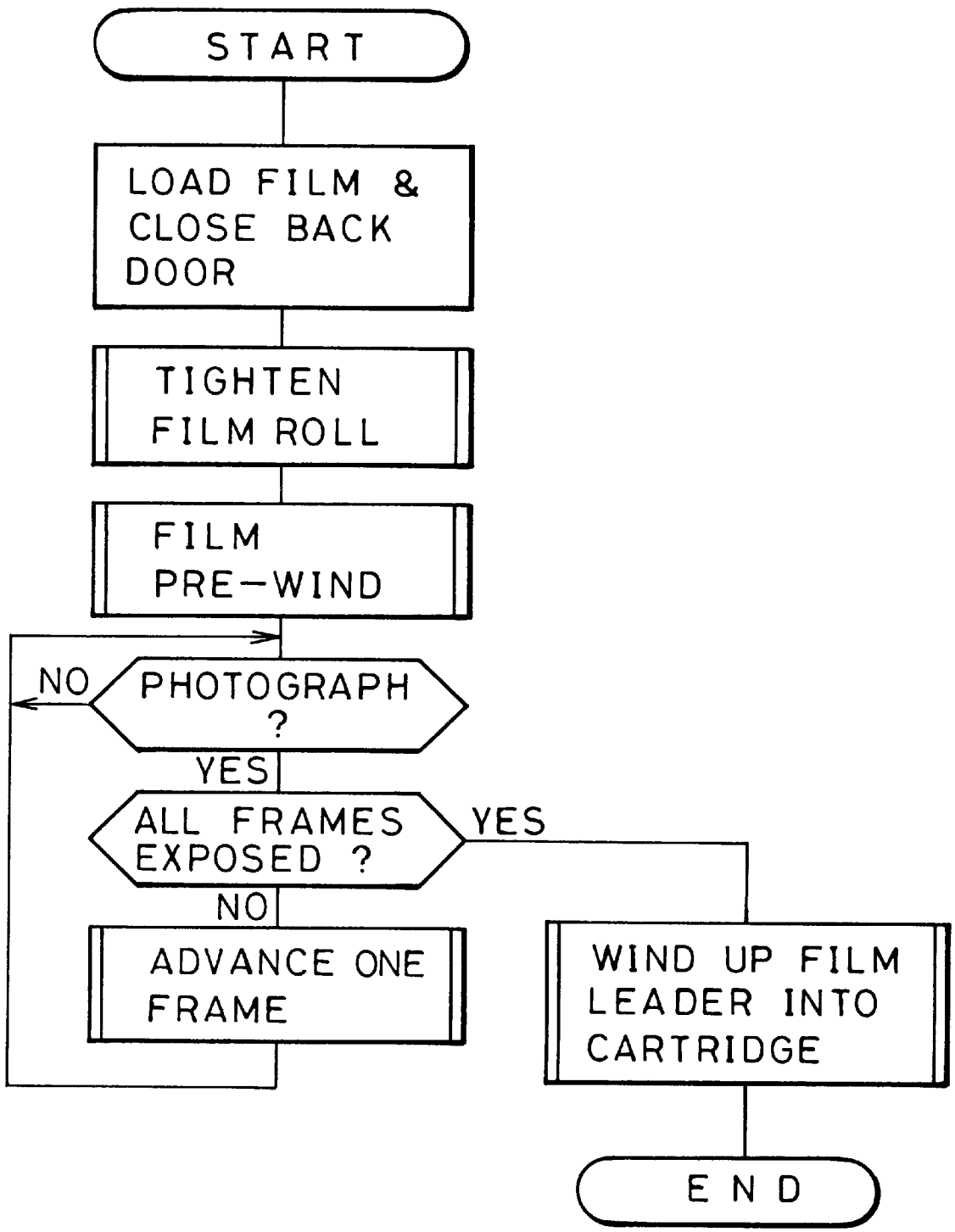
FIG. 5 is a flow chart explaining the sequence of the film advance operation of the camera.
Figure 6:
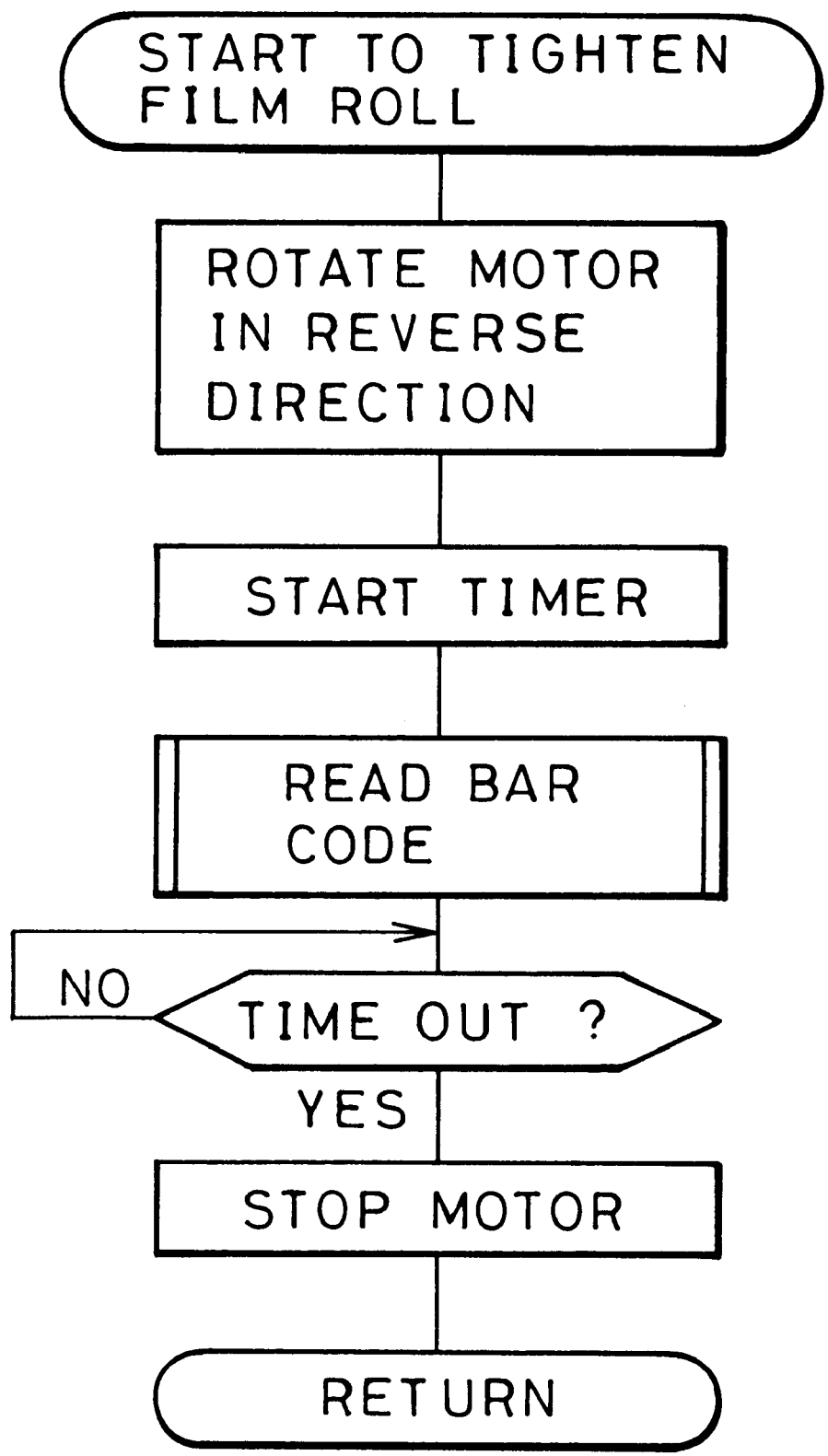
FIG. 6 is a flow chart further explaining the subsequence of the film roll tightening operation illustrated broadly in FIG. 5.

The operation of this embodiment will be described with reference to FIGS. 5 to 7. As is shown in FIG. 5, the photographic film cartridge 8 is loaded in the cartridge chamber after opening the rear door (not shown) of the camera. In this case, the photographic film cartridge 8 can be easily loaded in the camera because the film leader does not extend out of the cartridge shell 10.

When the rear door is closed, the sub-sequence of tightening the film roll automatically starts. In this film roll tightening sequence, a motor starts rotating in the reverse direction as shown in the flow chart of FIG. 6. The motor is mounted within the take-up spool disposed in the take-up chamber. During this reverse rotation, the rotation is transmitted via a gear train and torque limiter to a fork 17 in the cartridge chamber. During the normal rotation, the rotation is transmitted via a friction clutch to the take-up spool.

As the motor starts rotating in the reverse direction so as to tighten the film roll, the rotation is transmitted via the fork 17 to the cartridge spool 11. As the cartridge spool 11 rotates in the reverse direction, the roll of the negative film 12 wound about the spool is tightened to remove any play or looseness. For the roll tightening sequence, a timer is activated to count the reverse rotation time. After the lapse of a predetermined time, the reverse rotation of the motor is stopped.

During the roll tightening operation, the bar code disc 13 rotates and the bar code sensor 30 optically reads the bar code 15 on the bar code disc 13, and outputs signals such as those shown in FIG. 4. When the bar code sensor 30 faces a dark bar 20, it outputs a signal V1, and when it faces a light bar 21, it outputs a signal V2. When the bar code sensor 30 does not face any of the bars 20 and 21, it outputs a signal VH. The first comparator 33 outputs an "H" signal when the bar code sensor 30 detects the bar 20 or 21. On the other hand, the second comparator 34 outputs an "H" signal only when the bar code sensor 30 detects a dark bar 20.

The delay circuit 35 delays the output of the first comparator 33 a time less than the time spanned by the pulse width of the output of the first comparator 33. The delayed signal is used as a shift clock for the contents of the shift register 38 at the rising edge of the delayed signal. As a result, logic signals representing the dark and light bars 20 and 21 passing in front of the bar code sensor 30 are sequentially inputted to the shift register 38. Synchronously with signal from the one-rotation detector 40, the controller 39 receives output signals of the shift register 38. In this manner, all the information of the bar code 15 recorded on the bar code disc 13 can be read correctly by the controller 39. The controller 39 analyzes the bar code 15 and obtains the information such as the film speed and number of frames.

Figure 7:
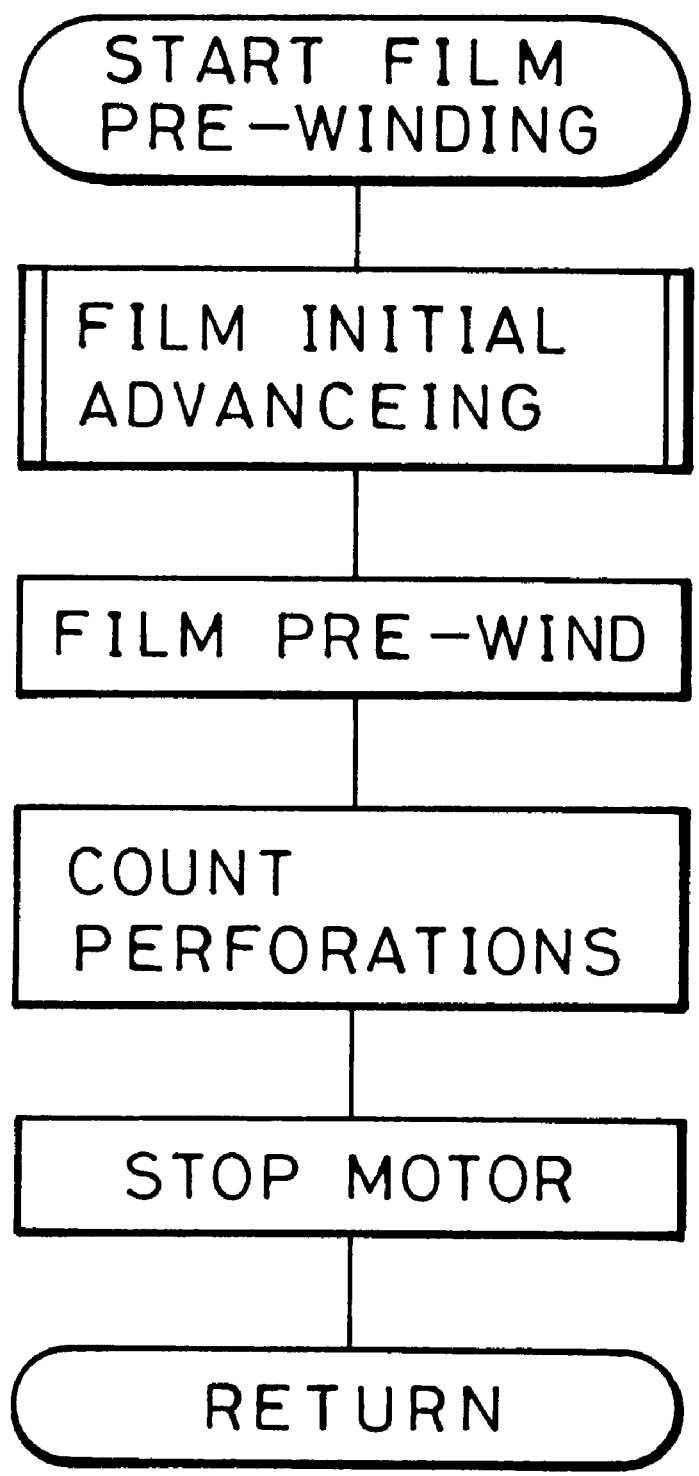
FIG. 7 is a flow chart further explaining the subsequence of the film pre-winding operation illustrated broadly in FIG. 5.

After the sub-sequence of film roll tightening, a film pre-winding sub-sequence is performed as shown in FIG. 7. During this sub-sequence, the film initial advance and pre-winding operations are sequentially executed. For the initial film advance, the motor is rotated in the normal direction for a predetermined time to rotate the take-up spool and fork 17. As the fork 17 causes the cartridge spool 11 to rotate, the film roll tightly wound about it starts rotating so that the film leader passes through the film passage mouth 10a and is advanced out of the cartridge 9. When the film leader passes by the exposure aperture of the camera and enters the film take-up chamber, it is captured by the film take-up spool.

After the film initial advance, the motor continues to rotate in the normal direction to execute film pre-winding. During this film pre-winding, the unexposed negative film 12 is pulled out of the cartridge 9 by the rotation of the take-up spool. Although the speed of rotation of the take-up spool is faster than that of the rotation of the cartridge spool, the fork 17 rotates with the advance of the negative film 12 by the operation of the torque limiter.

During the pre-winding of the negative film 12, the perforation sensor disposed along the film passage interconnecting the cartridge chamber and the take-up chamber detects the perforation 12a. A signal from the perforation sensor is counted by a perforation counter. The controller 39 is already supplied with the number of frames capable of being photographed; and by reading the bar code, it operates to stop the motor when the contents of the perforation counter coincide with the number of frames. As a result, for example, in the case of a negative film with 24 frames, the frame indicated by "24" to be first photographed is set at the back of the exposure aperture. The number of remaining frames, "24", is displayed on a liquide crystal display mounted on the outer surface of the camera.

When the release button of the camera is depressed, the controller 39 calculates the exposure time from the film speed obtained from the bar code 15 and the subject brightness measured by a photometry sensor, as is well known in the art. The shutter is operated for the exposure time to photograph frame No. 24. After this photograph is taken, the motor starts rotating in the reverse direction to rotate via the fork 17 the cartridge spool 11 and to wind the exposed negative film 12 into the cartridge 9. When the perforation sensor detects the perforation 12a, the reverse rotation of the motor is stopped, thereby to position the frame No. 23 behind the exposure aperture. The remaining number of frames "23" is displayed on the display.

In a similar manner, each time the release button is operated, one frame is photographed. When the remaining number of frames becomes "0", the motor continuously rotates for a predetermined time to wind the leader of the negative film 12 into the cartridge 9. After the motor is stopped, the back door is opened to pick up the cartridge 9 into which the exposed negative film 12 has been stepwise rewound.

In the above embodiment, the bar code is read when the film roll is tightened. The bar code 15 may be read during the initial film advance operation during which the film leader is captured by the take-up spool by rotating the cartridge spool 11. When the motor starts rotating in the normal direction, the cartridge spool 11 is rotated via the fork 17, to advance the film leader out of the cartridge 9. In this case, as described earlier, the timer is activated to allow the film initial advance operation to be performed for a predetermined time. During this initial film advance, the bar code disc 13 is caused to make one rotation during which the bar code 15 is read. In this embodiment, the rotational direction of the bar code disc 13 is reversed as compared to the arrangement in the embodiment shown in FIG. 7. It is therefore necessary to reverse the arrangement of the bar code 15.

Figure 9:
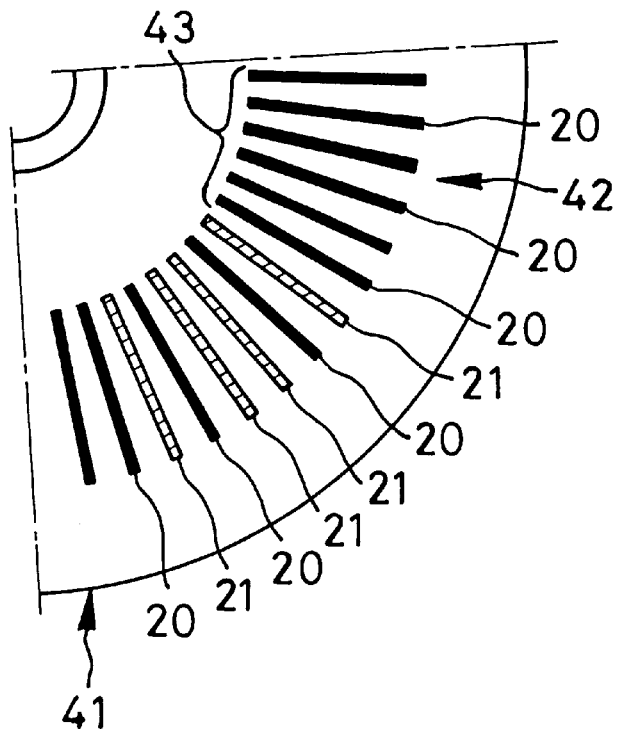
FIG. 9 is a diagram showing an example of a bar code having a one-rotation mark.

FIG. 9 shows a bar code disc 41 having recorded thereon a bar code 42 having a one-rotation mark 43. The one rotation mark or end mark 43 is formed at the end of the bar code 42 and is represented by six identical logical values, e.g., six dark bars 20. In this case, the remainder of the bar code 42 should be configured so as not to contain the one-rotation mark 43.

Figure 10:
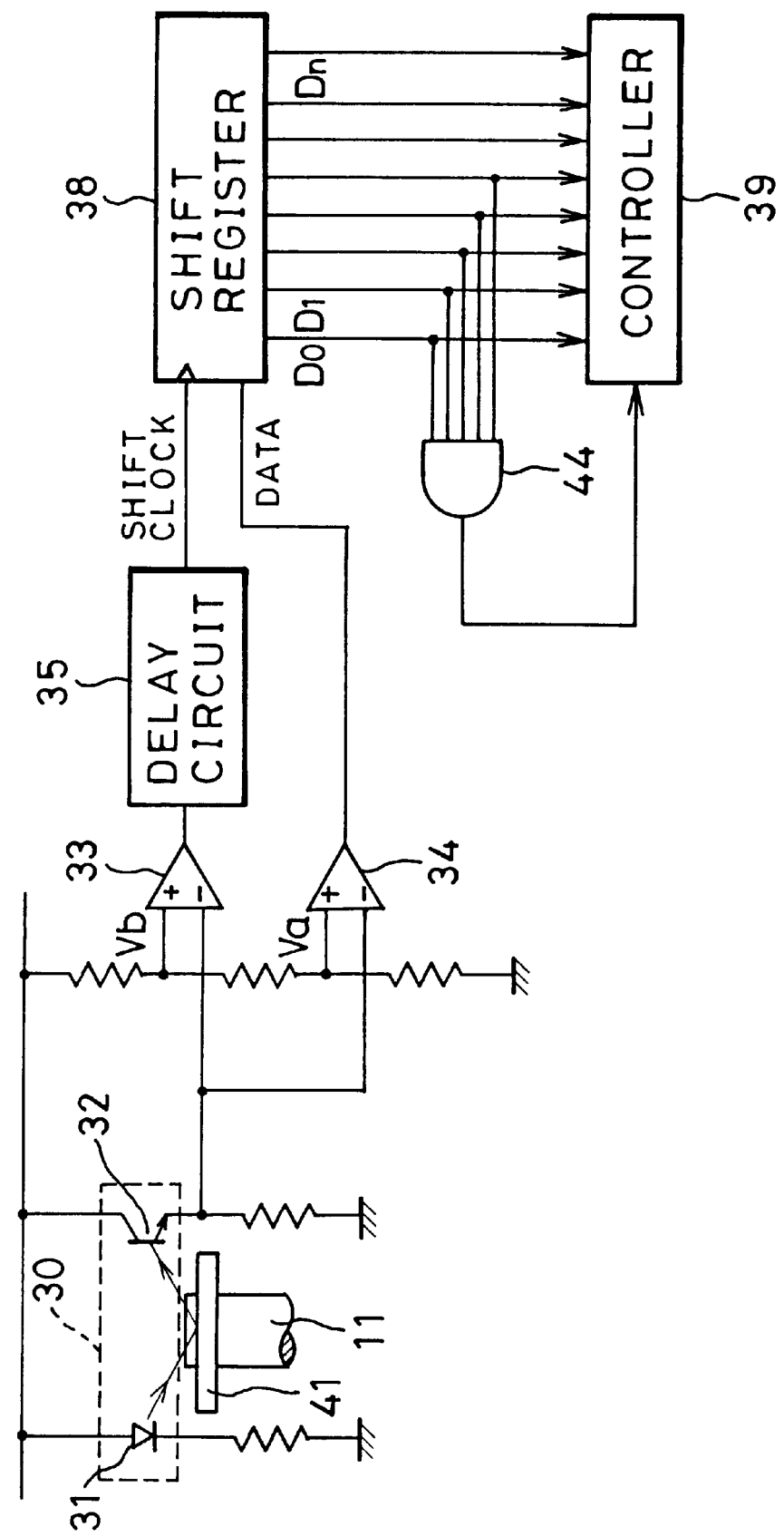
FIG. 10 is a circuit diagram of the bar code reader for reading the bar code shown in FIG. 9.

As is shown in FIG. 10, the one-rotation mark 43 can be discriminated from the logical product of output signals of the shift register 38, the logical product being obtained by an AND gate 44. In this manner, one rotation of the bar code disc 41 or the end of reading of the bar code can be known from the signal read by the bar code sensor 30.

Figure 11:
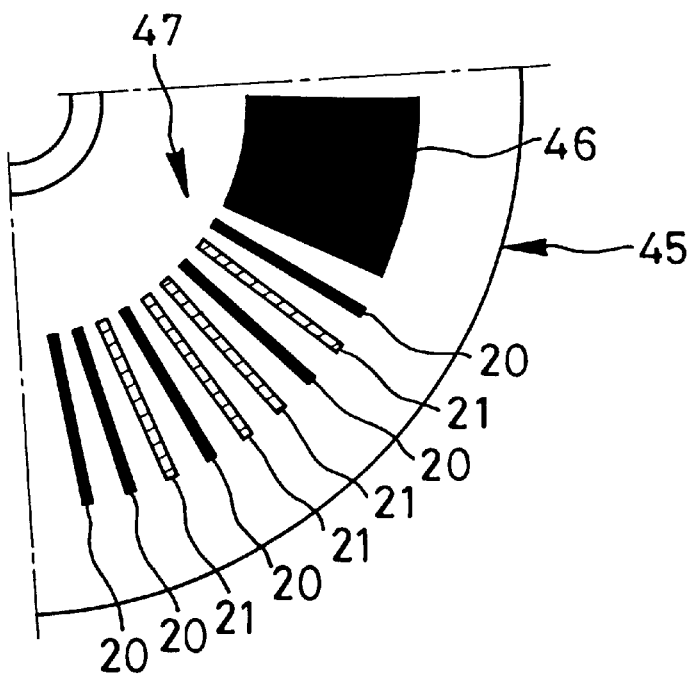
FIG. 11 is a diagram of another example of the bar code having a one-rotation mark.
Figure 12:
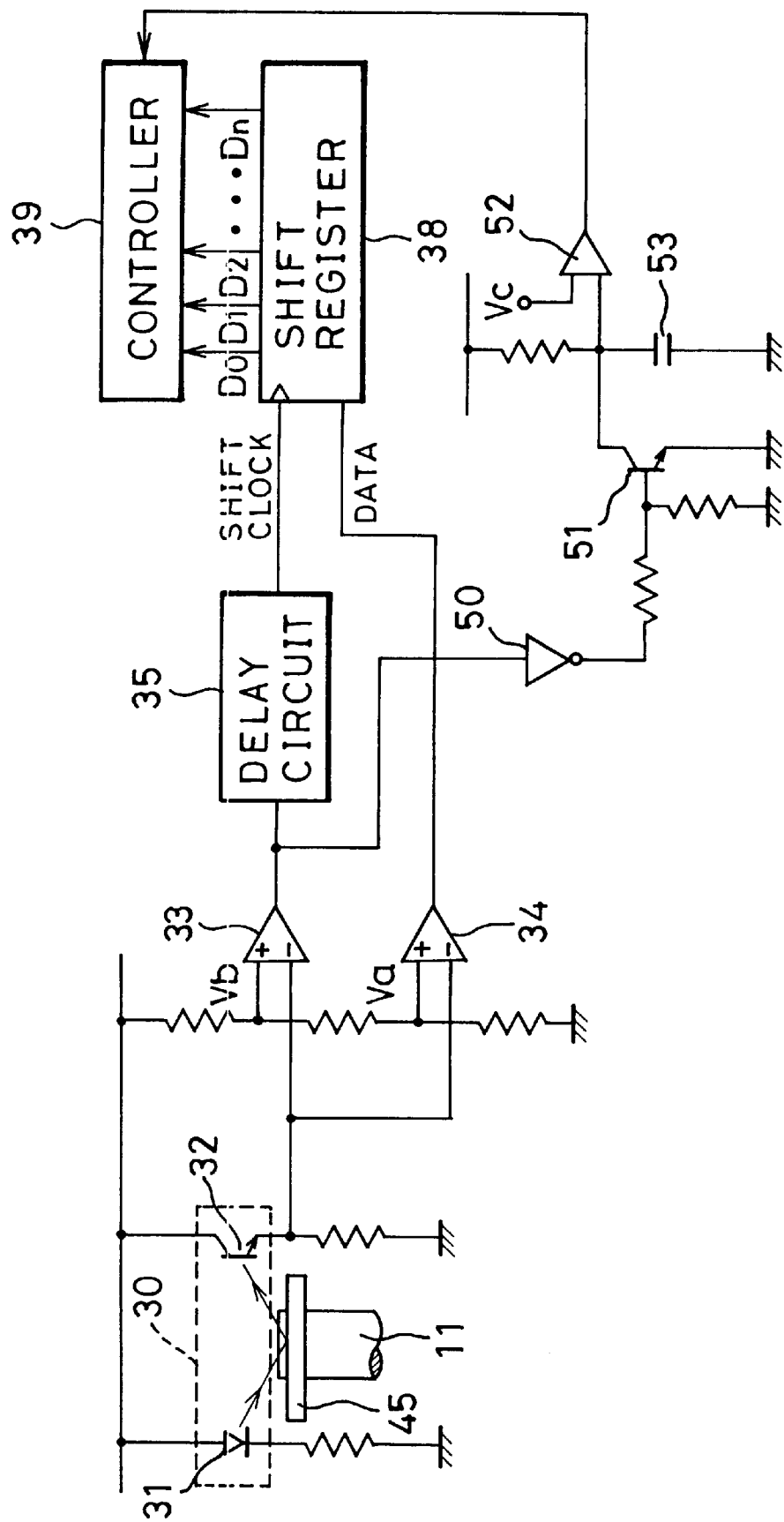
FIG. 12 is a circuit diagram of the bar code reader for reading the bar code shown in FIG. 11.

FIG. 11 shows a bar code disc 45 having a bar of large width as the one-rotation mark 46. For the bar code 47 having such a one-rotation mark 46, the circuit shown in FIG. 12 is used to distinguish between the one-rotation mark 46 and the bars 20 and 21 representing the film information.

As is shown in FIG. 13, an output signal of the bar code sensor 30 is changed to an "H" signal by the first comparator 33 when the bar code sensor 30 faces the bars 20 and 21 and the one-rotation mark 46. When the first comparator 33 outputs an "H" signal, it is inverted to an "L" signal by an inverter 50 to turn off a transistor 51, so that an integrating capacitor 53 is charged. On the other hand, when the bar code sensor 30 does not detect the bar, the transistor 51 turns on to discharge the integrating capacitor 53. A third comparator 52 is used for discriminating the one-rotation mark 46, and compares the voltage across the integrating capacitor 53 with a reference voltage Vc set by taking into consideration the width of the one-rotation mark 46.

Since the bar code sensor 30 faces the bars 20 and 21 for a relatively short time, the voltage across the integrating capacitor 53 will not reach the reference voltage Vc. On the other hand, the bar code sensor 30 faces the one-rotation mark for a relatively long time, and the charge time of the integrating capacitor 53 is long. Therefore, the voltage across the integrating capacitor 53 becomes higher than the reference voltage Vc. As a result, an output signal of the third comparator 52 becomes the "H" signal, allowing to detect the one rotation of the bar code disc 45 or the completion of reading of the bar code. It is possible to reliably discriminate between the one-rotation mark 46 and the bars 20 and 21, without keeping rotation of the cartridge spool 11 at a constant angular velocity and without using a rotary encoder.

Figure 14:
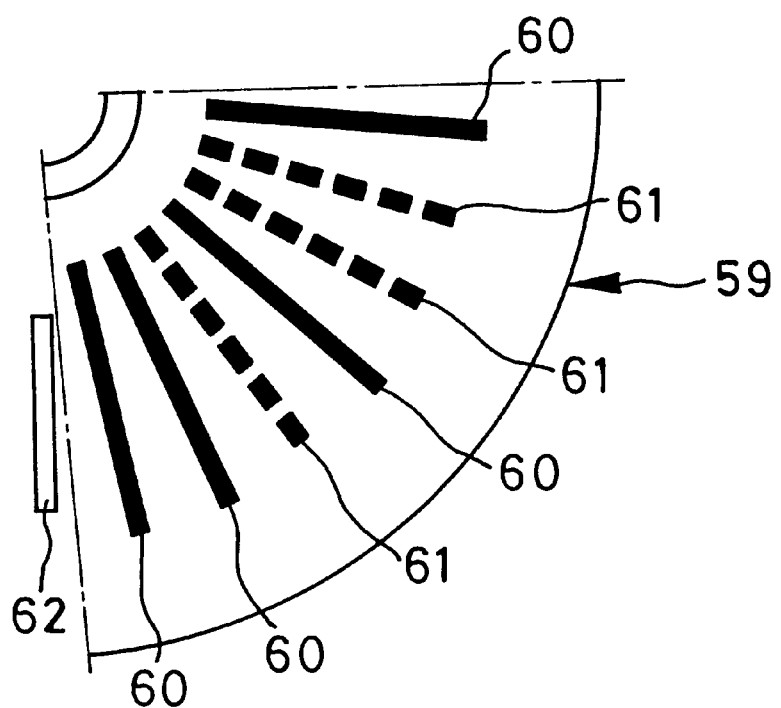
FIG. 14 is a diagram showing another embodiment of the bar code using a broken bar and a solid bar.

FIG. 14 shows a bar code disc 49 having a bar code which is detected to be either dark or light on the basis of an average optical density. In this embodiment, a solid bar 60 and a broken bar 61 having the same width and local optical density are used. A bar code sensor 62 has a length covering substantially the whole length of each bar. Since the reflectance of the base of the bar code disc 49 is high, the solid bar 60 has a higher average optical density than that of the broken bar 61. In representing the optical densities of the bars, a pattern having different optical densities may also be used as the dark bar.

Figure 15:
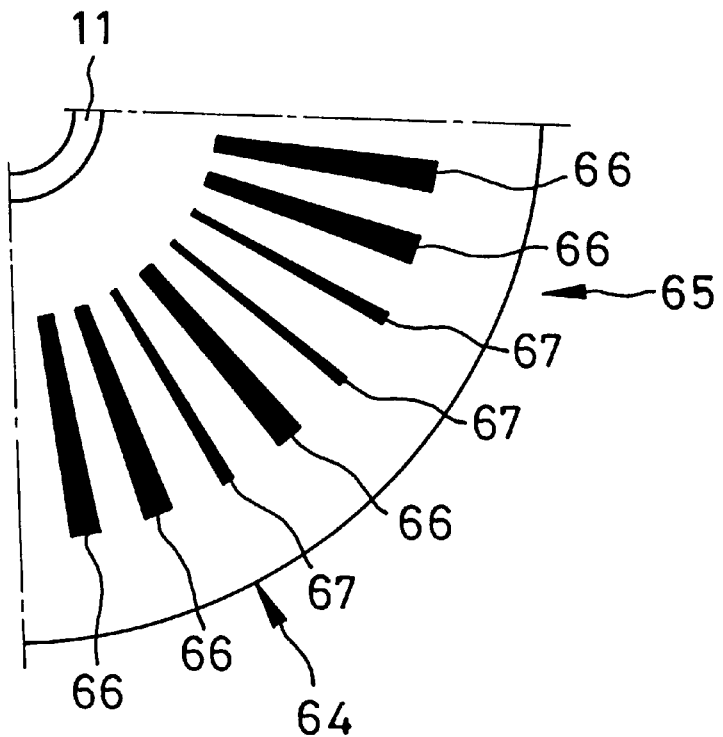
FIG. 15 is a diagram showing a bar code represented by two types of bars having different widths.

FIG. 15 shows a bar code using two types of bars having different widths. The bar code 65 is recorded on the bar code disc 64, and is formed by radially extending wide bars 66 and narrow bars 67. The wide bars 66 correspond to the logical value "1", and the narrow bars 67 correspond to the logical value "0".

Figure 16:
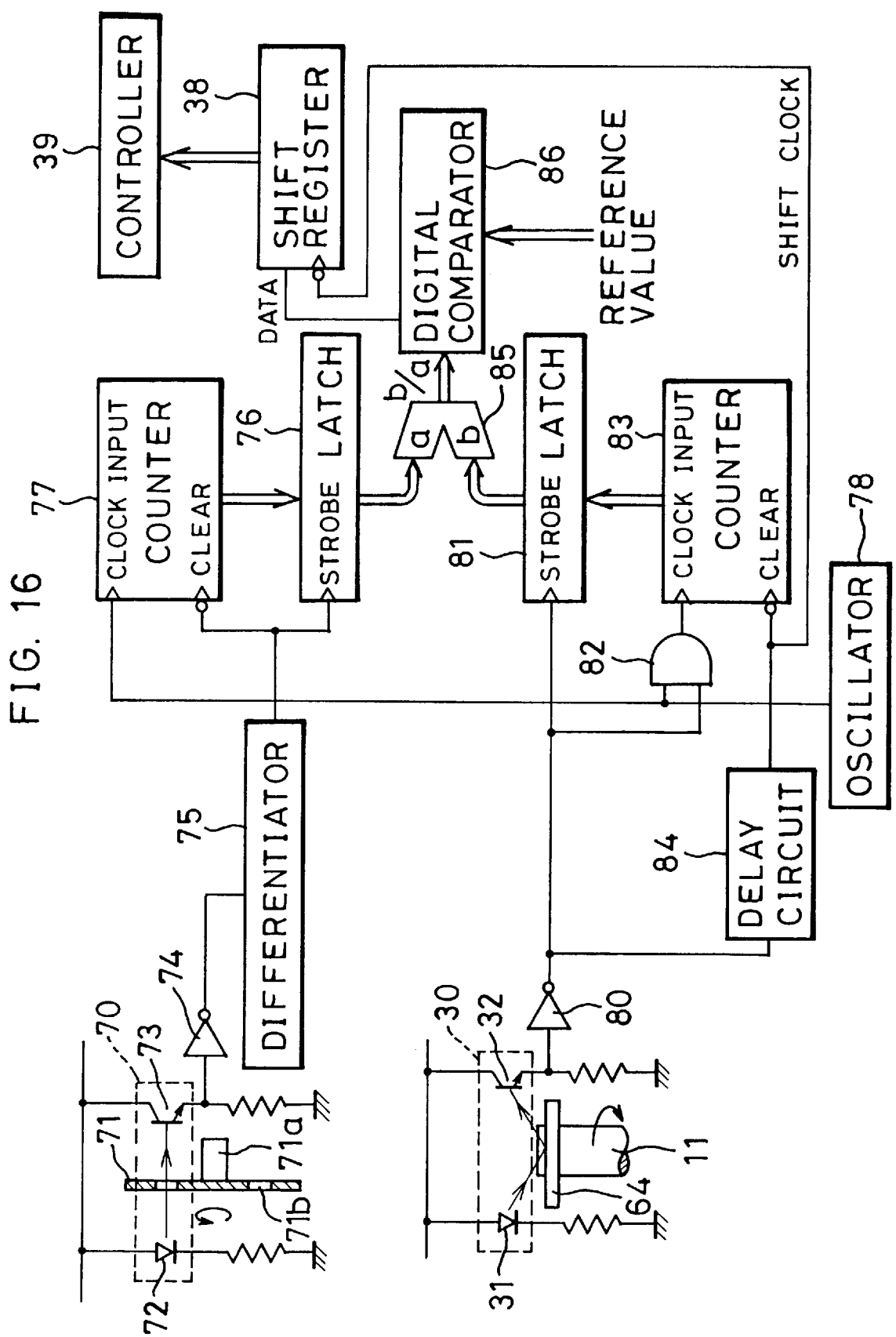
FIG. 16 is a circuit diagram showing the bar code reader used for reading the bar code shown in FIG. 15.

FIG. 16 illustrates the bar code reader for adding the bar code 65 shown in FIG. 15. The relationship between the film advance amount D along the film passage and the rotary angle δ of the bar code disc 64 is given by:

$$D = \delta \cdot d$$

where d represents the radius of the outermost turn of the negative film 12 wound about the cartridge spool 11. Although the radius d changes with the number of the frame in the exposure position and with the degree of tightness of the wound film roll, it can be considered constant during the period the bar code disc 64 rotates once or twice. Under such conditions, the rotary angle δ of the cartridge spool 11 can be considered to vary as the film advance amount D. As a result, the film advance amount D can be used as the rotary angle of the bar code disc 64.

In addition to the above, cameras using a film having a magnetic layer and recording photographic information or the like on this layer have been proposed recently (e.g., refer to U.S. Pat. No. 4,864,332 and JP-A-3-504421). Such a camera of the type in which information is recorded magnetically or photographically has a film encoder which generates a pulse signal each time the negative film 12 is advanced by a unit length. In the embodiment shown in FIG. 15, the widths of the bars 66 and 67 of the bar code 65 are discriminated by using such a film encoder.

A film encoder 70 for this purpose is constituted by a rotary disc 71, a light projector 72 and a light receiver 73. The rotary disc 71 is mounted on a roller 71a, which is arranged in the film passageway to be rotated by being pressed against the moving negative film 12. The rotary disc 71 is provided with a plurality of slits 71b arranged at a constant pitch. A photosensor consisting of the projector 72 and the receiver 73 detects each of the slits 71b. Note that, if a reflective type photosensor is instead used, the rotary disc 71 can be provided with reflective narrow portions arranged at a constant pitch.

The film encoder 70 generates a pulse at an interval proportional to the film advance speed. An output signal of the film encoder 70 is inverted by an inverter 74, and sent to a differentiator 75. This differentiator 75 generates a very narrow pulse at the rising edge of the output signal of the inverter 74. The pulse outputted from the differentiator 75 is sent to a strobe input terminal of a latch 76 to effect the latch operation at its rising edge. The pulse of the differentiator 75 is also supplied to the clear input terminal of a first counter 77 to effect a clearing operation at its falling edge. The first counter 77 counts clock signals of a high frequency outputted from an oscillator 78.

Figure 17:
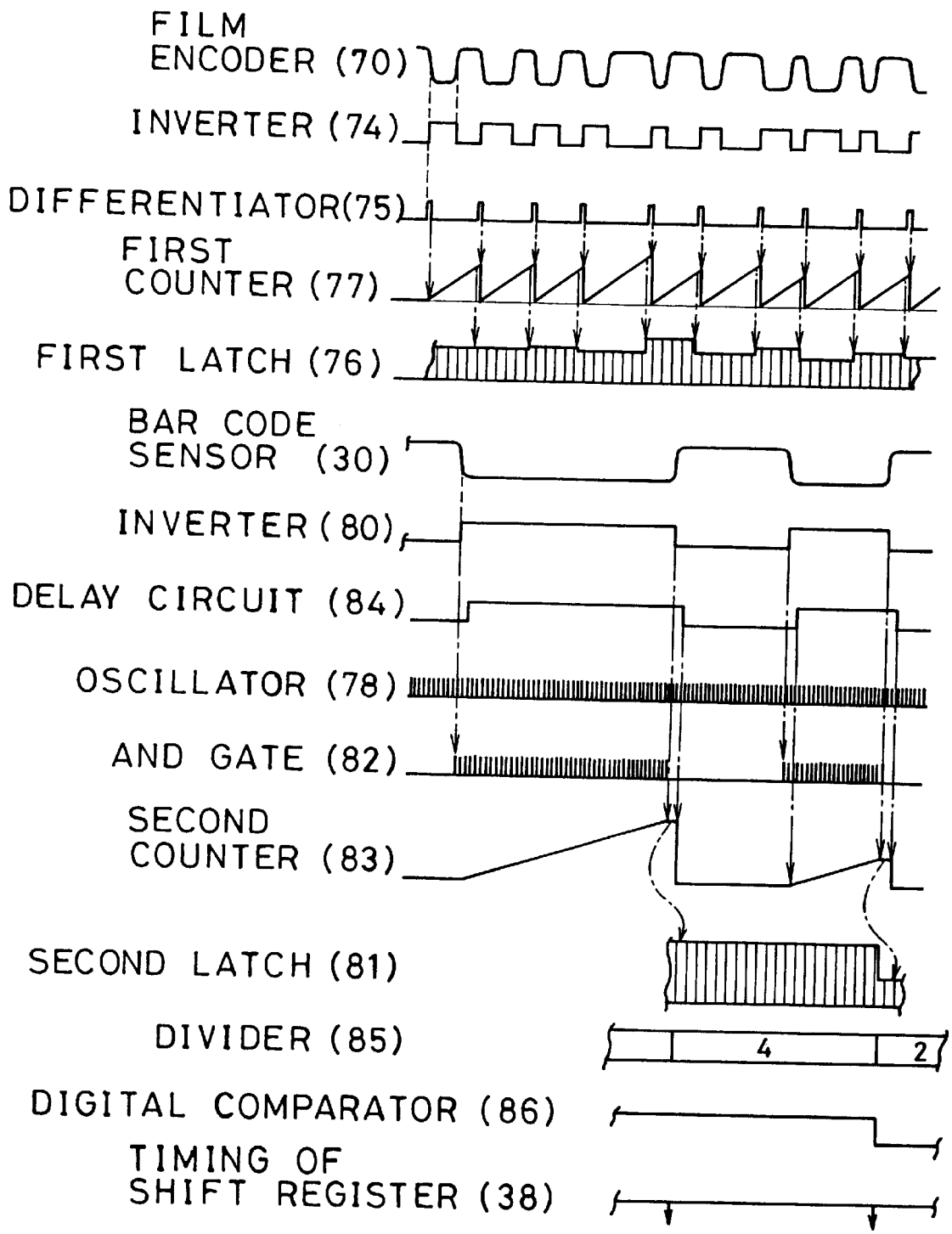
FIG. 17 is a timing chart explaining the operation of the circuit shown in FIG. 16.
Figure 18:
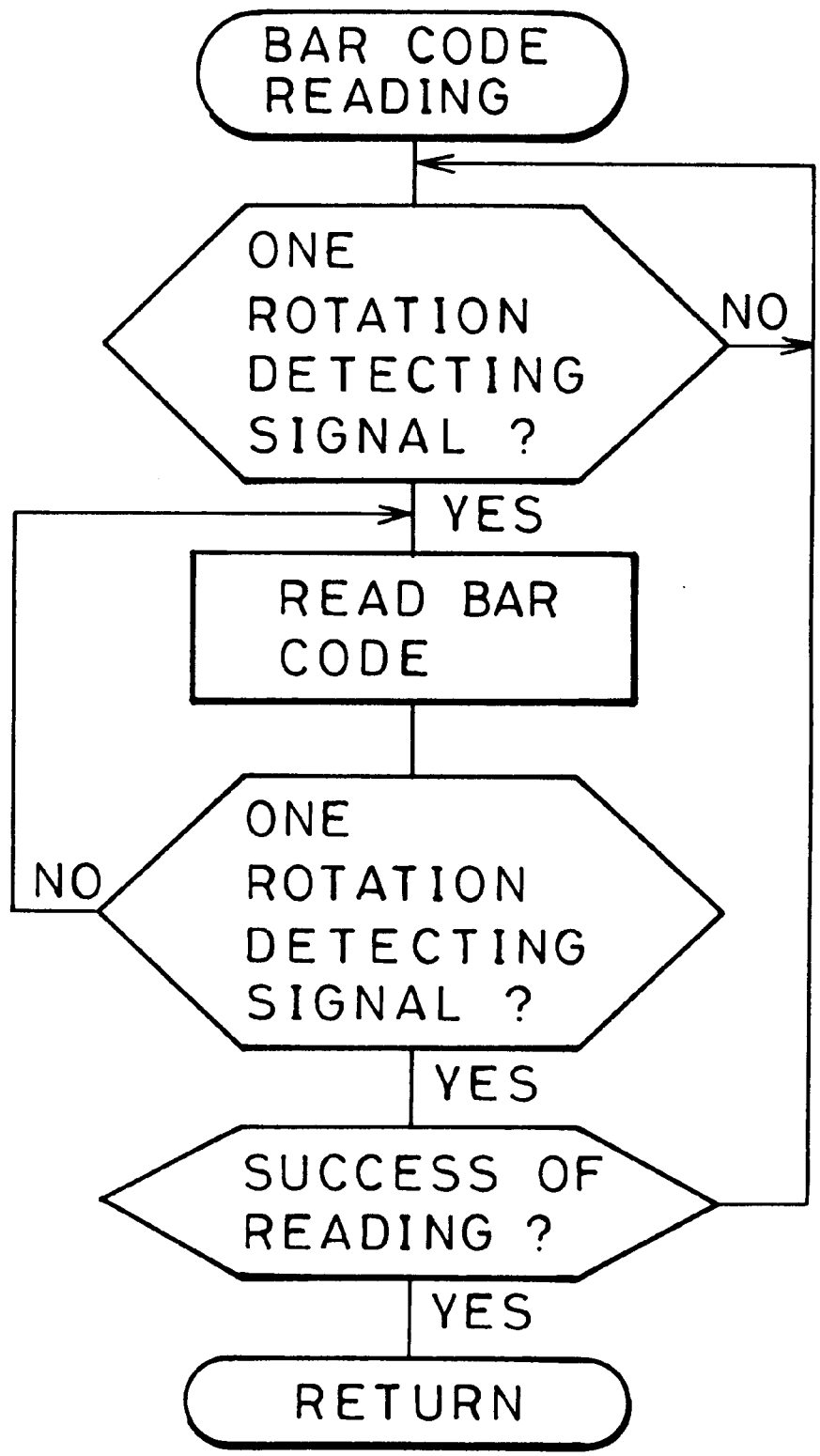
FIG. 18 is a flow chart illustrating the bar code reading procedure.

As shown in FIG. 17, the film encoder 70 generates a narrow pulse each time the negative film 12 is advanced by a predetermined length. At the rising edge of this pulse, the differentiator 75 generates a narrow pulse. At the rising edge of the pulse from the differentiator 75, the count of the first counter 77 is latched by the first latch 76, and at the falling edge, the first counter 77 is cleared to resume counting clock signals. In this manner, the fist latch temporarily stores the count of the first counter 77 each time the film encoder 70 generates a pulse.

An output of the bar code sensor 30 is sent via an inverter 80 to the strobe input terminal of a second latch 81 and to an AND gate 82. While the bar code sensor 30 detects the bar, the AND gate 82 supplies clock signals from the oscillator 78 to a second counter 83. An output signal from the inverter 80 is delayed by a delay circuit 84, and sent to the clear input terminal of the second counter 83 to effect the clearing operation at its falling edge. The count of the second counter 83 is latched by a second latch 81.

When the bar code sensor 30 detects one of the bars 66 and 67, the output signal of the inverter 80 becomes the "H" signal to open the AND gate 82. The second counter 83 then counts clock signals from the oscillator 78. After the detected bar passes the bar code sensor 30, the output signal of the inverter 80 becomes the "L" signal to close the AND gate 82 and stop the count operation of the second counter 83. At the same time, the second latch 81 latches the count of the second counter 83. Although the count of the second counter 83 changes with the film advance speed, it corresponds to the time during which the bar is detected.

Therefore, the count can be correlated to the bar width. Immediately thereafter, the output signal of the delay circuit 84 clears the second counter 83 to prepare for the next count operation. In this manner, the second latch 81 latches the data regarding the width of the bar detected by the bar code sensor 30. The latched data are updated by the data of the next bar upon completion of detection of the next bar.

As described previously, the film advance amount D is proportional to the rotary angle δ of the bar code disc 64 within the range of several rotations. It is therefore possible to obtain the data proportional to the angle defined by the bar width, by dividing the data in the second latch 81 by the data in the first latch 76. To this end, immediately after the latch operation by the second latch 81, the division operation is performed by a divider 85. In the example shown in FIG. 17, the broad pulse has a value "4", and the narrow pulse has a value "2". The datum proportional to the bar width is sent to a digital comparator 86 to check whether it is greater than a reference value, e.g., value "3". The result of comparison by the digital comparator 86 is inputted to a shift register 38 at the falling edge of an output signal of the delay circuit 84. Finally, in response to the one-rotation signal, the datum in the shift register 38 is inputted to the controller 39.

Figure 8:
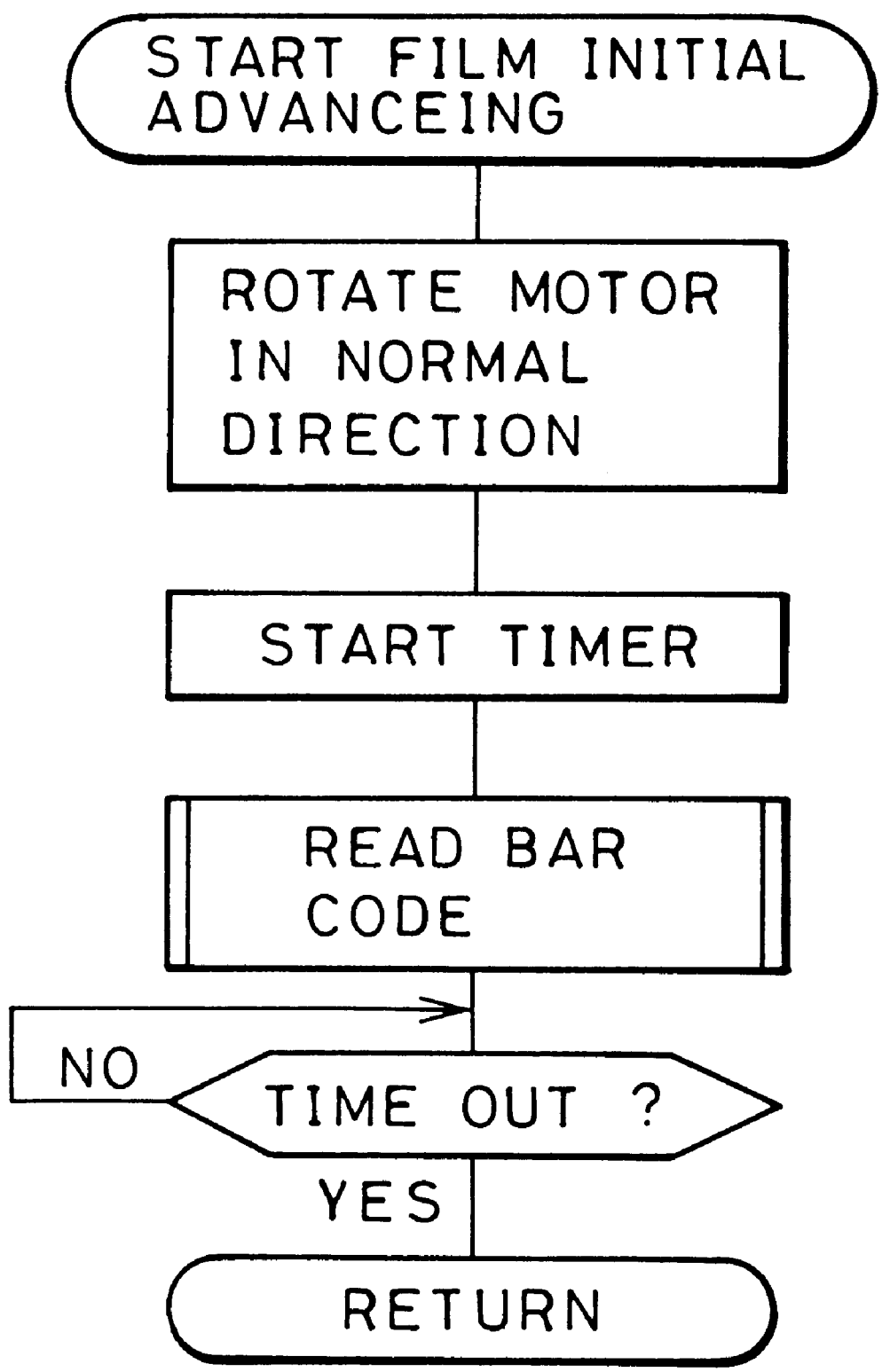
FIG. 8 is a flow chart explaining the sub-sequence of reading a bar code during the film initial advance.

Reading the bar code is performed during the film initial advance operation illustrated in FIG. 8. During this film initial advance, the bar code disc 13 rotates. During the rotation of the bar code disc 64, the bar code sensor 30 reads the bar code 65. The procedure of reading the bar code 65 is illustrated in FIG. 187. First, it is determined whether the one-rotation detection signal is present or absent. If present, the bar code is read, until the next one-rotation detection signal is detected. In this manner, the bar code is fully read. In the case of a failure in reading the bar code, the bar code read operation is repeated.

The reference value of the digital comparator 86 can be changed while referring to the previous output of the divider 85 for each bar. With such an arrangement, a measurement error due to the somewhat increased diameter of the exposed negative film 12 wound about the take-up reel can be avoided. Although the datum latched in the first latch 76 is used for the division operation, this datum represents only part of one bar under detection. it is therefor preferable to store the counts of the first counter measured for the entirety of the bar and to calculate the average of the counts immediately before the division operation, to use the average for the division operation.

Figure 19:
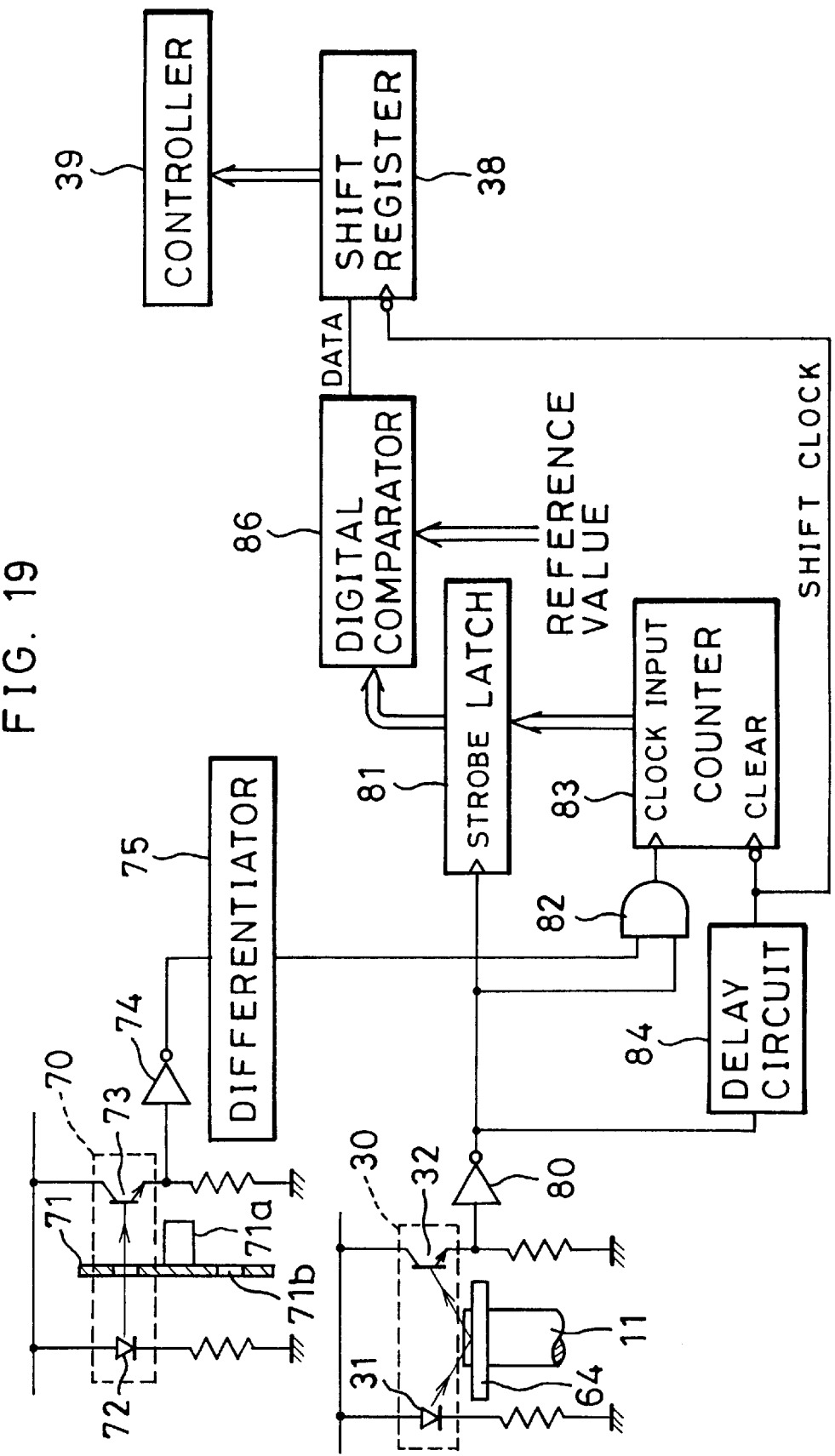
FIG. 19 is a circuit diagram showing another embodiment wherein the type of bar is discriminated by counting the number of encoder pulses while the bar code sensor faces the bar.

For the purpose of simplifying the description, the period of pulses of the film encoder 70 has been assumed to be long. However, the actual period is about one tenth of what is described and shown, thus providing discrimination between the types of bars with high precision. With such a short period of pulses of the film encoder 70, instead of measuring the period of pulses of the film encoder 70, the number of pulses of the film encoder 70 may be counted while the bar code sensor 30 detects a bar. FIG. 19 illustrates this embodiment. In FIG. 19, like elements to those shown in FIG. 16 are represented by using identical reference numerals. A counter 83 counts pulses outputted from the film encoder 70. The count of the counter 83 is latched by a latch 81 and sent to a digital comparator 86 to compare it with a reference value. The comparison result discriminates between the types of bars.

The negative film 12 of the above embodiments has one perforation per one frame. A plurality of perforations, e.g., eight perforations per one frame, may be formed in each frame at a predetermined pitch, like a 135-type negative film which is now widely used. In this case, in place of the film encoder, a perforation sensor is disposed along the film passage. As the perforation sensor, a microswitch and a photosensor using an infrared ray to which negative film is insensitive may be used. In this case, the film encoder 70 shown in FIG. 16 is replaced by the perforation sensor. The period of pulses of the perforation sensor is longer than that of the bar code sensor 30, so that an output signal of the divider 85 is "1.0" or less. Even though each bar cannot be discriminated with high precision because of the very long interval between pulses generated by the perforation sensor, it is an advantage of a perforation sensor that a camera not needing a film encoder can be used with it.

Figure 20:
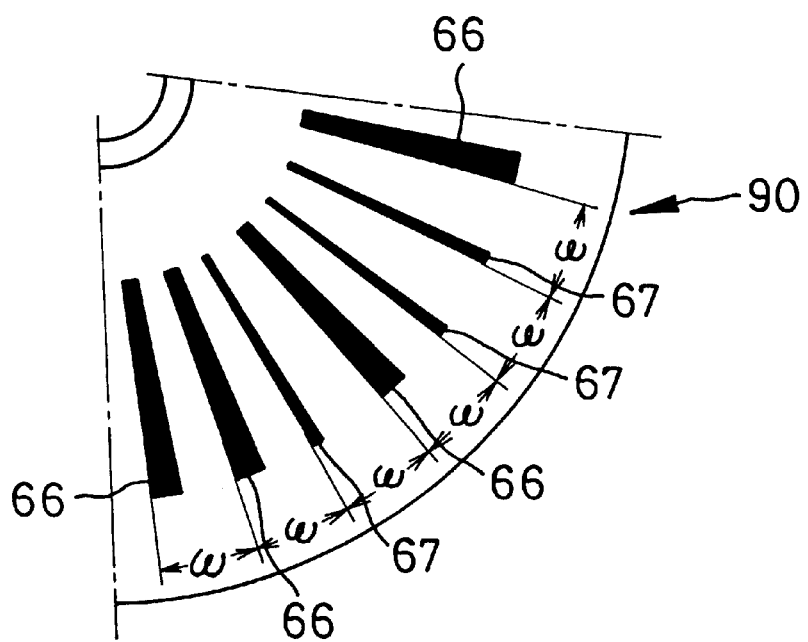
FIG. 20 is a plan view of a bar code having two types of bars disposed at equal angular intervals between adjacent bar front edges.

FIG. 20 shows a bar code disc having a bar code represented by two types of bars disposed at equal angular intervals. Irrespective of the different widths of the bars 66 and 67 of the bar code 90, they are all disposed with an angular interval ω between adjacent front edges of the bars. With this bar code 90, the interval between the times the car code sensor 30 detects the front edges of bars can be used as the signal representing the unit angle of rotation. It is therefore unnecessary to use a film encoder and a perforation sensor.

Figure 21:
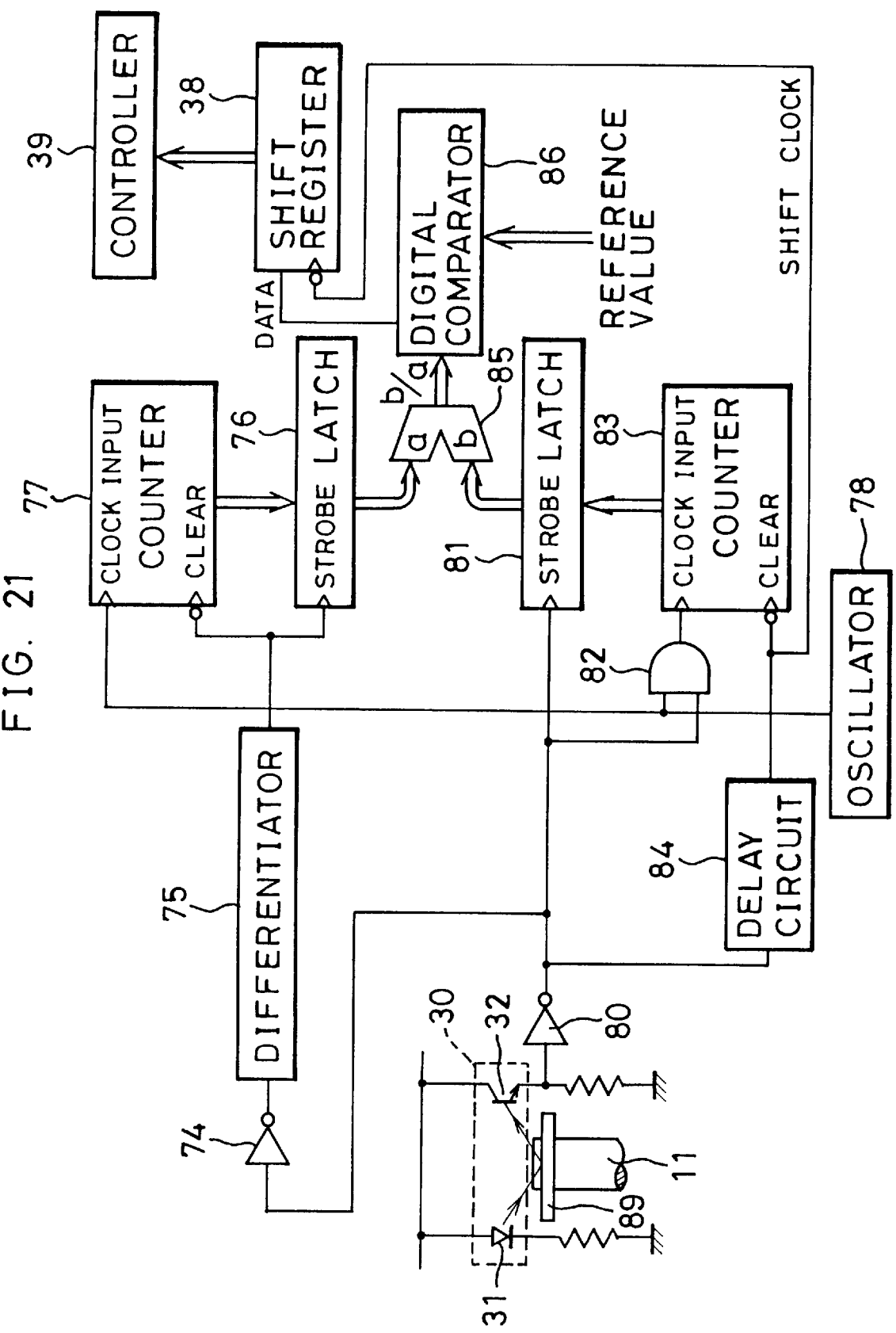
FIG. 21 is a circuit diagram of the bar code reader for reading the bar code shown in FIG. 10.
Figure 22:
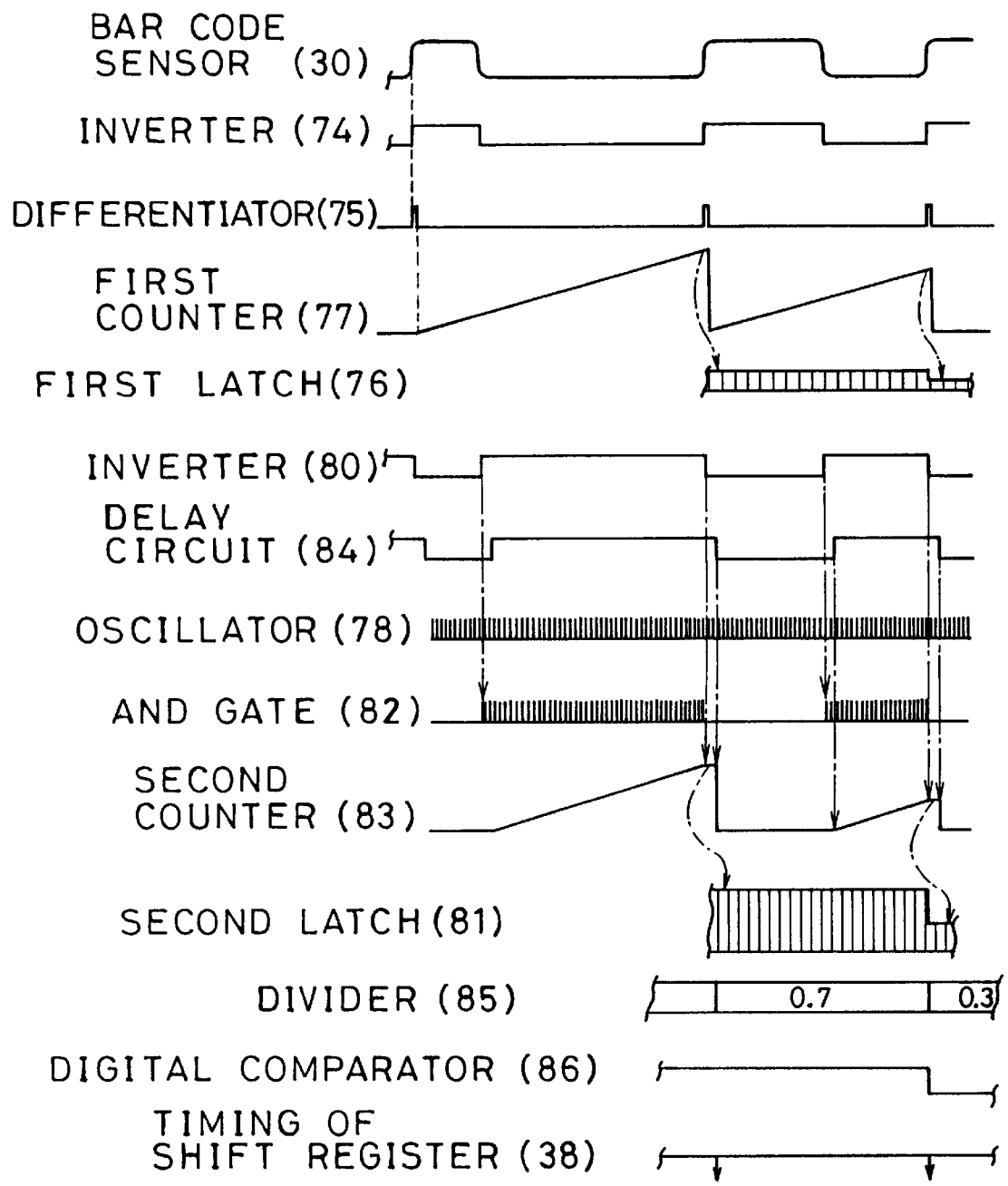
FIG. 22 is a timing chart explaining the operation of the circuit shown in FIG. 21.

FIG. 21 illustrates the bar code reader used for the embodiment shown in FIG. 20. Elements like those shown in FIG. 16 are represented by using identical reference numerals. In this embodiment, an output of the bar code sensor 30 is sent via an inverter 74 and differentiator 75 to a first counter 77. The first counter 77 counts clock signals from an oscillator 78 during the period from the detection of the front edge of a bar to the detection of the front edge of the next bar. The count is latched by a first latch 76. The datum obtained by a divider 85 corresponds to the angle defined by the bar width, because the angular interval ω is constant over which the front edges of adjacent two bars are detected. The datum obtained by the divider 85 can discriminate the widths of the bars.

In the above embodiments, two types of bars have been used. However, in order to record film information in greater detail, three types of bars may be used having three different optical densities and/or widths. In order to read a bar code independently from the different rotational directions of the bar code disc, a start mark and an end mark for indicating the reading direction may be formed on opposite sides of the area recording the film information. Furthermore, although reading a bar code has been performed in the above embodiments during the film initial advance operation or during the film roll tightening operation, it may be performed upon the advance of a first frame immediately after the power of the camera is turned on.

Although the present invention has been described with reference to the preferred embodiments shown in the drawings, the invention should not be limited by the disclosed embodiments. Instead various modifications, changes, combinations and the like of the present invention can be effected without departing from the spirit and scope of the appended claims.

What is claimed is:

1. A photographic film cartridge having a cartridge shell and a spool housed rotatably in said cartridge shell, said spool having a photographic film wound about said spool, said photographic film cartridge comprising:

a bar code disc rotatable with said spool; and
 a bar code recorded on said bar code disc in the rotational direction of said bar code disc, said bar code representing information describing the number of frames on said photographic film and being comprised by a combination of a plurality of data bars having different optical densities;

said photographic film having one perforation per frame, the number of said perforations being equal to said number of frames described by said bar code.

2. A photographic film cartridge according to claim 1, wherein said plurality of data bars includes a first data bar of a first optical density and a second data bar of a second optical density lower than said first optical density.

3. A photographic film cartridge according to claim 2, wherein said first data bar is a solid line, and said second data bar is a broken line.

4. A photographic film cartridge according to claim 1, wherein said bar code disc is housed within said cartridge shell, said bar code being readable through a window formed in said cartridge shell.

5. A photographic film cartridge according to claim 1, wherein a leader of said photographic film is advanced out of said cartridge shell by rotating said spool.

6. A photographic film cartridge according to claim 1, wherein said bar code disc is a flange of said spool.

7. A photographic film cartridge according to claim 1, wherein said bar code disc further includes a mark representing that all said bar code has been read during one rotation of said bar code disc.

8. A photographic film cartridge according to claim 7, wherein said mark is formed by an array of bars identical to said first or second data bars.

9. A photographic film cartridge according to claim 7, wherein said mark has a width in the direction of rotation of said bar code disc greater than a width of either of said first and second data bars.

10. A photographic film cartridge having a cartridge shell and a spool housed rotatably in said cartridge shell, said spool having a photographic film wound about said spool, said photographic film cartridge comprising:

a bar code disc rotatable with said spool; and a bar code recorded on said bar code disc in the rotational direction of said bar code disc, said bar code representing information describing the number of frames on said photographic film and being comprised by a combination of a plurality of data bars having different widths in said rotational direction, said plurality of data bars being disposed at a constant angular interval between adjacent front edges of said data bars;

said photographic film having one perforation per frame, the number of said perforations being equal to said number of frames described by said bar code.

11. A photographic film cartridge according to claim 10, wherein said plurality of data bars includes a first data bar of a first width and a second data bar of a second width less than said first width.

12. A photographic film cartridge according to claim 10, wherein said bar code disc is housed within said cartridge shell, said bar code being readable through a window formed in said cartridge shell.

13. A photographic film cartridge according to claim 11, wherein a leader of said photographic film is advanced out of said cartridge shell by rotating said spool.

14. A photographic film cartridge according to claim 13, wherein said bar code disc is a flange of said spool.

15. A bar code reader for reading a bar code form a photographic film cartridge, said photographic film cartridge having: a cartridge shell; a spool housed rotatably in said cartridge shell, said spool having a photographic film wound about said spool; a bar code disc rotatable with said spool; and a bar code recorded on said bar code disc in a rotational direction of said bar code disc, said bar code representing information describing said photographic film and being comprised by a combination of a plurality of data bars having different optical densities, said bar code reader comprising:

a bar code sensor for measuring the optical density of said data bars while said bar code disc rotates;

means for differentiating between the different optical densities of the data bars in accordance with an output signal from said bar code sensor; and means for sequentially storing data corresponding to said discriminated optical densities of the data bars; and wherein said bar code is read during a film roll tightening operation wherein, prior to advancing a leader of said photographic film out of said cartridge shell, said spool is rotated in a winding direction to tightly wind the roll of said photographic film wound on said spool.

16. A bar code reader according to claim 15, wherein said plurality of data bars includes a first data bar of a first optical density and a second data bar of a second optical density lower than said first optical density.

17. A bar code reader according to claim 15, wherein said bar code disc is housed within said cartridge shell, said bar code being readable through a window formed in said cartridge shell.

18. A bar code reader according to claim 15, wherein a leader of said photographic film is advanced out of said cartridge shell by rotating said spool.

19. A bar code reader according to claim 18, wherein said bar code is read during an operation wherein said spool is rotated to advance the leader of said photographic film out of said cartridge shell.

20. A bar code reader according to claim 15, wherein said bar code sensor is a photosensor having a light projector and a light receiver.

21. A bar code reader according to claim 16, wherein said differentiation means includes a first comparator for comparing an output signal from said bar code sensor with a first reference value, discriminating between said first data bar and said second data bar, and generating a binary signal corresponding to a differentiation thus effected.

22. A bar code reader according to claim 21, wherein said sequential storing means comprises:

a second comparator for comparing an output signal from said bar code sensor with a second reference value, and for deriving both said first and said second data bars;

a delay circuit for delaying an output signal from said second comparator; and a shift register for shifting and storing a binary signal outputted from said first comparator by using an output signal from said delay circuit as a shift clock.

23. A bar code reader according to claim 15, wherein said bar code further includes a one-rotation mark formed by N identical bars, said one-rotation mark representing that all of said bar code has been read during one rotation of said bar code disc.

24. A bar code reader according to claim 23, further comprising an AND gate for obtaining a logical product of output signals of fewer than N bits from said shift register, an output signal from said AND gate recognizing that said one-rotation mark has been read.

25. A bar code reader according to claim 15, wherein said bar code further includes a one-rotation mark having a width in the rotational direction of said bar code disc greater than the width of either of said first and said second data bars, said one-rotation mark representing that all of said bar code has been read during one rotation of said bar code disc.

26. A bar code reader according to claim 25, further comprising an integrating capacitor, a transistor for discharging said integrating capacitor in response to an output signal from said second comparator, and a comparator for outputting a signal indicating that said one-rotation mark has been read, when said integrating capacitor reaches a reference voltage.

27. A bar code reader for reading a bar code from a photographic film cartridge, said photographic film cartridge having: a cartridge shell; a spool housed rotatably in said cartridge shell, said spool having a photographic film wound about said spool; a bar code disc rotatable with said spool; and a bar code recorded on said bar code disc in a rotational direction of said bar code disc, said bar code representing information describing said photographic film and being comprised by a combination of a first data bar and a second data bar that are respectively wide and narrow in the rotational direction of said bar code disc, said bar code reader comprising:

a film encoder for generating an encoder pulse each time said photographic film is transported by a predetermined amount;

means for generating clock pulses;

a first counter for counting said clock pulses, said first counter being cleared by said encoder pulse;

a bar code sensor for detecting said data bars;

a second counter for counting said clock pulses during the time said bar code sensor detects said data bar; and determining means for performing a division operation by using a total number of counts of said first and second counters, and in accordance with said division result, outputting binary signals corresponding to said first and second data bars.

28. A bar code reader according to claim 27, wherein said determining means includes a divider, and a comparator for comparing a reference value with a division result by said divider and outputting said binary signals.

29. A bar code reader according to claim 27, wherein said film encoder includes a rotary disc rotating with the lengthwise movement of said photographic film and having a plurality of slits formed at a constant pitch, and a photosensor for detecting the passage of said slits.

30. A bar code reader according to claim 27, wherein said bar code disc is housed within said cartridge shell, said bar code being readable through a window formed in said cartridge shell, and a leader of said photographic film being advanced out of said cartridge shell by rotation of said spool.

31. A bar code reader for reading a bar code on a photographic film cartridge, said photographic film cartridge having: a cartridge shell; a spool housed rotatably in said cartridge shell, said spool having a photographic film wound about said spool; a bar code disc rotatable with said spool; and a bar code recorded on said bar code disc in a rotational direction of said bar code disc, said bar code representing information describing said photographic film and being comprised by a combination of a first data bar and a second data bar narrower than said first data bar in the rotational direction of said bar code disc, said bar code reader comprising:

a film encoder for generating an encoder pulse each time said photographic film is moved lengthwise by a predetermined amount;

a bar code sensor for detecting said first or second data bar and generating a bar detection signal;

a counter for counting said encoder pulse while said bar code sensor generates said bar detection signal; and determining means for determining type of data bar from a count of said counter and outputting a binary signal corresponding to one of said first and second data bars.

32. A bar code reader according to claim 31, wherein said film encoder includes a rotary disc rotating with the lengthwise movement of said photographic film and having a plurality of slits formed at a constant pitch, and a photosensor for detecting a passage of said slits.

33. A bar code reader according to claim 31, wherein said bar code disc is housed within said cartridge shell, said bar code being readable through a window formed in said cartridge shell, and a leader of said photographic film being advanced out of said cartridge shell by rotating said spool.

34. A bar code reader for reading a bar code from a photographic film cartridge, said photographic film cartridge having: a cartridge shell; a spool housed rotatably in said cartridge shell, said spool having a photographic film wound about said spool; a bar code disc rotatable with said spool; and a bar code recorded on said bar code disc in a rotational direction of said bar code disc, said bar code representing information describing said photographic film and being comprised by a combination of a first data bar and a second data bar narrower than said first bar in the rotational direction of said bar code disc, said bar code reader comprising:

a bar code sensor for detecting said first and second data bars;

edge detecting means for detecting an edge of a data bar in accordance with an output signal from said bar code sensor;

means for generating clock pulses;

a first counter for counting said clock pulses during a time said bar code sensor detects said edge;

a second counter for counting said clock pulses during a time said edge detecting means detects said edge; and determining means for determining a width of said data bar from a total number of counts of said first and second counters and outputting binary signals corresponding to said first and said second data bars.

35. A bar code reader according to claim 34, wherein said determining means includes a divider, and a comparator for comparing a reference value with a division result from said divider and for outputting said binary signal.

36. A bar code reader according to claim 34, wherein said bar code disc is housed within said cartridge shell, said bar code being readable through a window formed in said cartridge shell, and a leader of said photographic film being advanced out of said cartridge shell by rotating said spool.

37. A bar code reader for reading a bar code from a photographic film cartridge, said photographic film cartridge having: a cartridge shell; a spool housed rotatably in said cartridge shell, said spool having a photographic film wound about said spool; a bar code disc rotatable with said spool; and a bar code recorded on said bar code disc in a rotational direction of said bar code disc, said bar code representing information describing said photographic film and being comprised by a combination of a plurality of data bars on said bar code disc having different widths in the rotational direction of said bar code disc, said bar code reader comprising:

means for detecting an angular velocity of said bar code disc;

a bar code sensor for detecting said data bars;

means for differentiating between data bars of different widths by detecting a width of a data bar using an angular velocity signal from said angular velocity detecting means and a signal from said bar code sensor; and means for storing data outputted from said differentiating means;

wherein said bar code is read during a film roll tightening operation wherein, prior to advancing a leader of said photographic film out of said cartridge shell, said spool is rotated in a winding direction to tightly wind the roll of said photographic film wound on said spool.

38. A bar code reader according to claim 37, wherein said plurality of data bars includes a first data bar and a second data bar of lesser width than said first data bar, and said discriminating means outputs binary signals corresponding to one of said first and second data bars.

39. A bar code reader according to claim 38, wherein said bar code disc is housed within said cartridge shell, said bar code being readable through a window formed in said cartridge shell.

40. A bar code reader according to claim 37, wherein the leader of said photographic film is advanced out of said cartridge shell by rotating said spool.

41. A bar code reader according to claim 40, wherein said bar code is read during an operation wherein said spool is rotated to advance the leader of said photographic film out of said cartridge shell.

42. A bar code reader according to claim 37, wherein said bar code sensor is a photosensor having a light projector and a light receiver.

43. A bar code reader according to claim 37, wherein said angular velocity detecting means generates a pulse each time said photographic film is moved lengthwise by a predetermined amount.

44. A bar code reader according to claim 37, wherein said angular velocity detecting means generates a pulse by detecting a perforation of said photographic film.

45. A bar code reader according to claim 37, wherein said angular velocity detecting means generates a pulse when said bar code sensor detects an edge of each of said data bars.

* * * * *